United States Patent
Lee et al.

(10) Patent No.: US 10,582,505 B2
(45) Date of Patent: Mar. 3, 2020

(54) METHOD AND APPARATUS FOR EXECUTING AN APPLICATION AUTOMATICALLY ACCORDING TO THE APPROACH OF WIRELESS DEVICE

(71) Applicant: SAMSUNG ELECTRONICS CO., LTD., Suwon-si (KR)

(72) Inventors: Sung-Min Lee, Suwon-si (KR); Se-Hee Han, Seoul (KR); Hyun-gyoo Yook, Seoul (KR); Seung-Jae Oh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/833,742

(22) Filed: Aug. 24, 2015

(65) Prior Publication Data

US 2015/0365933 A1   Dec. 17, 2015

Related U.S. Application Data

(63) Continuation of application No. 11/706,317, filed on Feb. 15, 2007, now Pat. No. 9,118,498.

(30) Foreign Application Priority Data

Feb. 15, 2006 (KR) .................. 10-2006-0014731

(51) Int. Cl.
  *H04W 72/04* (2009.01)
  *H04W 4/80* (2018.01)
  (Continued)

(52) U.S. Cl.
  CPC ......... *H04W 72/048* (2013.01); *H04L 12/282* (2013.01); *H04L 12/2803* (2013.01);
  (Continued)

(58) Field of Classification Search
  None
  See application file for complete search history.

(56) References Cited

U.S. PATENT DOCUMENTS 6,085,323 A   7/2000   Shimizu et al.
6,151,491 A   11/2000  Farris et al.
(Continued)

FOREIGN PATENT DOCUMENTS

EP   1530322 A2   5/2005
JP   7-134548 A   5/1995
(Continued)

OTHER PUBLICATIONS

Communication dated Jul. 23, 2007 issued by the Korean Intellectual Property Office in counterpart Korean Application No. 10-2006-0014731.

(Continued)

*Primary Examiner* — Alex Skripnikov
(74) *Attorney, Agent, or Firm* — Sughrue Mion, PLLC

(57) ABSTRACT

A home system is provided. In a method of executing an application, information for executing the application is received from a device when accessing of the device is sensed, and the application is executed based on the received information. Accordingly, when a user merely brings a wireless guest device near to or in contact with an access point or a wired home device, it is possible to allow the wireless guest device to simultaneously automatically set an optimum security environment for a wireless network and execute an application that the user desires.

13 Claims, 17 Drawing Sheets

(51) Int. Cl.

| | | |
|---|---|---|
| *H04L 12/28* | (2006.01) | |
| *H04L 29/06* | (2006.01) | |
| *H04W 12/02* | (2009.01) | |
| *H04W 12/00* | (2009.01) | |
| *H04W 12/04* | (2009.01) | |
| *H04W 64/00* | (2009.01) | |
| *H04N 1/00* | (2006.01) | |
| *H04N 1/327* | (2006.01) | |
| *H04W 84/12* | (2009.01) | |

(52) U.S. Cl.
CPC ...... *H04L 12/2816* (2013.01); *H04L 12/2827* (2013.01); *H04L 63/06* (2013.01); *H04L 63/20* (2013.01); *H04W 4/80* (2018.02); *H04W 12/003* (2019.01); *H04W 12/02* (2013.01); *H04W 12/04* (2013.01); *H04W 64/006* (2013.01); *H04L 63/04* (2013.01); *H04L 2012/2841* (2013.01); *H04L 2012/2849* (2013.01); *H04N 1/00204* (2013.01); *H04N 1/32797* (2013.01); *H04W 84/12* (2013.01)

(56) References Cited

U.S. PATENT DOCUMENTS

| | | | |
|---|---|---|---|
| 6,665,536 | B1 | 12/2003 | Mahany |
| 7,139,559 | B2 | 11/2006 | Kenagy et al. |
| 7,325,048 | B1 | 1/2008 | Milito et al. |
| 7,336,926 | B2 | 2/2008 | Noda et al. |
| 7,340,612 | B1 | 3/2008 | Durand et al. |
| 2001/0019953 | A1 | 9/2001 | Furukawa et al. |
| 2002/0002061 | A1 | 1/2002 | Miyasaka et al. |
| 2002/0016833 | A1 | 2/2002 | Yajima et al. |
| 2002/0035621 | A1 | 3/2002 | Zintel et al. |
| 2002/0073229 | A1 | 6/2002 | Hayashi |
| 2002/0147912 | A1 | 10/2002 | Shmueli et al. |
| 2002/0168040 | A1* | 11/2002 | Coffey ............... H04L 1/0054 375/350 |
| 2003/0095524 | A1 | 5/2003 | Stephens et al. |
| 2003/0101294 | A1 | 5/2003 | Saint-Hilaire |
| 2003/0107512 | A1* | 6/2003 | McFarland ........... G01S 7/021 342/159 |
| 2003/0110512 | A1 | 6/2003 | Maari |
| 2003/0142345 | A1 | 7/2003 | Bunn et al. |
| 2004/0053051 | A1 | 3/2004 | Saito et al. |
| 2004/0078169 | A1 | 4/2004 | Oba et al. |
| 2004/0107356 | A1 | 6/2004 | Shamoon et al. |
| 2004/0107366 | A1* | 6/2004 | Balfanz ............. H04L 12/1822 726/5 |
| 2004/0176118 | A1 | 9/2004 | Strittmatter et al. |
| 2004/0214524 | A1 | 10/2004 | Noda et al. |
| 2004/0242250 | A1 | 12/2004 | Sasai et al. |
| 2004/0247023 | A1 | 12/2004 | Sasai et al. |
| 2004/0259499 | A1 | 12/2004 | Oba et al. |
| 2004/0259539 | A1 | 12/2004 | Ayatsuka |
| 2005/0068571 | A1* | 3/2005 | Hart ................. H04N 1/00281 358/1.15 |
| 2005/0120096 | A1 | 6/2005 | Rekimoto et al. |
| 2005/0198221 | A1* | 9/2005 | Manchester ........ H04L 41/0213 709/220 |
| 2005/0231753 | A1 | 10/2005 | Mertama et al. |
| 2005/0266798 | A1 | 12/2005 | Moloney et al. |
| 2005/0276418 | A1 | 12/2005 | Hagiwara |
| 2006/0062391 | A1 | 3/2006 | Lee et al. |
| 2006/0133414 | A1 | 6/2006 | Luoma et al. |
| 2006/0141986 | A1* | 6/2006 | Shinozaki ........... H04M 3/5175 455/410 |
| 2006/0165133 | A1* | 7/2006 | Yokota ................. H04L 12/12 372/6 |
| 2006/0187858 | A1 | 8/2006 | Kenichi |
| 2006/0258289 | A1* | 11/2006 | Dua ................... H04M 1/7253 455/41.3 |
| 2009/0002730 | A1* | 1/2009 | Yamada .............. G06F 3/1204 358/1.9 |

FOREIGN PATENT DOCUMENTS

| | | |
|---|---|---|
| JP | 2003-85659 A | 3/2003 |
| JP | 2005-110238 A | 4/2005 |
| JP | 2007-528057 A | 10/2007 |
| KR | 1020020060950 A | 7/2002 |
| KR | 1020040050696 A | 6/2004 |
| KR | 1020060045669 A | 5/2006 |
| WO | 03054654 A2 | 7/2003 |

OTHER PUBLICATIONS

Communication, dated May 15, 2012, issued by the Japanese Patent Office in corresponding Japanese Application No. 2007-31292.
Communication dated Nov. 1, 2011 from the Japanese Patent Office in counterpart Japanese application No. 2007-031292.
Communication dated Mar. 8, 2018, issued by the United States Patent and Trademark Office in counterpart U.S. Appl. No. 14/824,648.
Communication dated Aug. 9, 2018, issued by the United States Patent and Trademark Office in counterpart U.S. Appl. No. 14/824,648.
Communication dated Mar. 7, 2019, issued by the United States Patent and Trademark Office in counterpart U.S. Appl. No. 14/824,648.

* cited by examiner

FIG. 4

| WIRELESS GATE DEVICE IP ADDRESS (41) | VALID (42) | WIRELESS GATE DEVICE IP ADDRESS (43) |
|---|---|---|
| XXX . XXX . XXX . X01 | 1 | XXX . XXX . XXX . X11 |
| XXX . XXX . XXX . X02 | 1 | XXX . XXX . XXX . X12 |
| XXX . XXX . XXX . X03 | 0 | XXX . XXX . XXX . X13 |
| ⋮ | ⋮ | ⋮ |

METHOD AND APPARATUS FOR EXECUTING AN APPLICATION AUTOMATICALLY ACCORDING TO THE APPROACH OF WIRELESS DEVICE

CROSS-REFERENCE TO RELATED PATENT APPLICATIONS

This application is a continuation application of U.S. patent application Ser. No. 11/706,317, filed on Feb. 15, 2007, which claims the priority of Korean Patent Application No. 10-2006-0014731, filed on Feb. 15, 2006, in the Korean Intellectual Property Office, the disclosures of which are incorporated herein in their entirety by reference.

BACKGROUND OF THE INVENTION

1. Field of the Invention

Methods and apparatuses consistent with the present invention relate to a home system, and more particularly, to an access point located in a home, a wired device, and a wireless device entering the home.

2. Description of the Related Art

As various types of home devices have been introduced to the market, various home services have been provided. Further, various types of wireless devices have been introduced to the market, and thus, home services that these wireless devices can use have also been provided. However, since communication can be established via mobile wireless devices, there is a possibility that a wireless device, which the user does not want to use the home resources, will use the home resources. To prevent this problem, many solutions aimed at tightening security for home wireless networks have been introduced.

However, the wireless network security solutions that have been introduced require users to set a wireless network environment by themselves. Therefore, most users, who are not experts in wireless network technologies, rarely use these solutions. For example, in order to allow a wireless device to use home resources, a user must set an encryption key needed for securing the wireless network into the wireless device. Also, in order to prevent the wireless device from further using the home resources, the user must revoke the encryption key installed into the wireless device. Accordingly, conventional users feel that using a wireless network security solution is inconvenient and difficult.

Furthermore, even if the user sets a wireless network environment as described above, the user must access and search several home devices for desired content so as to reproduce the content in the wireless device, thereby causing inconvenience to the user. This problem is expected to become more serious since the types of home devices are becoming more and more diversified and more users are using these devices.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention may provide an apparatus and method of allowing a wireless device to use home resources through a common sense intuitional interaction suitable for a user who is not an expert in wireless network technologies.

The present invention may also provide a computer readable medium having recorded thereon a program for executing the method in a computer.

According to an aspect of the present invention, there is provided a method of executing an application, the method comprising, if accessing of a device is sensed, receiving information for executing the application from the device; and executing the application based on the received information.

According to another aspect of the present invention, there is provided an apparatus for executing an application, the apparatus comprising a first interface that receives information for executing the application from a device when accessing of the device is sensed; and an application management unit that executes the application based on the received information.

According to another aspect of the present invention, there is provided a computer readable medium having recorded thereon a program for executing the method of executing the application.

According to another aspect of the present invention, there is provided a method of supporting executing of an application, the method comprising transmitting information for executing the application to a device when accessing of the device is sensed; and transmitting content to be used for executing the application to the device.

According to another aspect of the present invention, there is provided an apparatus for supporting execution of an application, the apparatus comprising a first interface that transmits information for executing the application to a device when accessing of the device is sensed; and a second interface that transmits content to be used for executing the application to the device.

According to another aspect of the present invention, there is provided a computer readable medium having recorded thereon a program for executing the method of supporting execution of the application.

According to another aspect of the present invention, there is provided a method of relaying an application that is being executed, the method comprising receiving a first content to be used for executing the application from a first device via a first communication channel when accessing of the first device is sensed; and transmitting a second content corresponding to the received first content to a second device via a second communication channel.

According to another aspect of the present invention, there is provided an apparatus for relaying an application that is being executed, the apparatus comprising a first interface that receives a first content to be used for executing the application from a first device via a first communication channel when accessing of the first device is sensed; and a second interface that transmits a second content corresponding to the first content to a second device via a second communication channel.

According to another aspect of the present invention, there is provided a computer readable medium having recorded thereon a program for executing the method of relaying the application that is being executed.

BRIEF DESCRIPTION OF THE DRAWINGS

The above and other aspects of the present invention will become more apparent by describing in detail exemplary embodiments thereof with reference to the attached drawings in which:

FIG. 4 is a diagram of an Internet protocol (IP) management table of an IP filter of the access point according to an exemplary embodiment of the present invention;

DETAILED DESCRIPTION OF THE EXEMPLARY EMBODIMENTS

Hereinafter, exemplary embodiments of the present invention will be described in detail with reference to the accompanying drawings.

Figure 1:
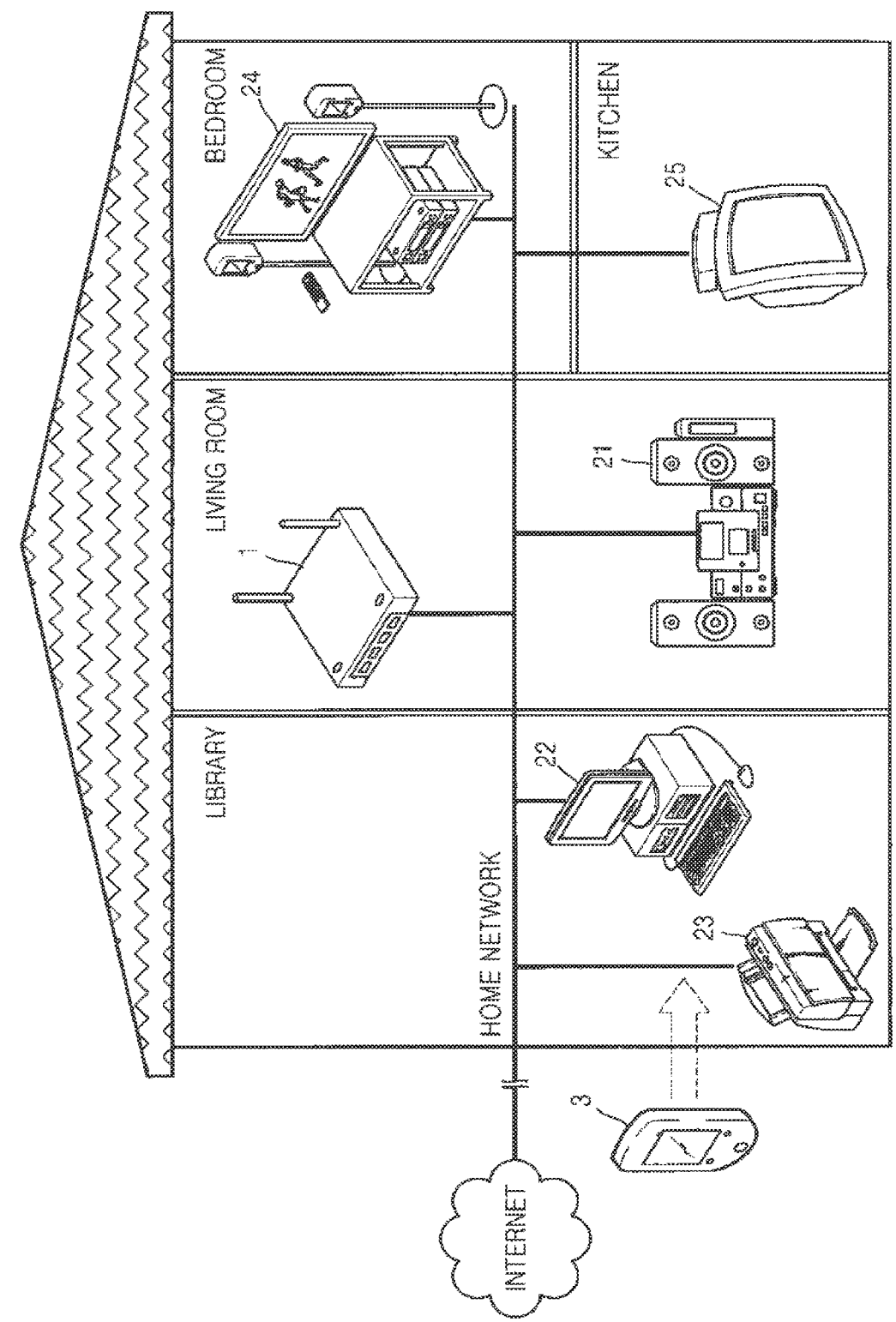
FIG. 1 is a diagram of a home system according to an exemplary embodiment of the present invention.

FIG. 1 is a diagram of a home system according to an exemplary embodiment of the present invention. Referring to FIG. 1, the home system includes an access point (AP) 1, a wired home device 21-25, and a wireless guest device 3.

The AP 1 connects the wireless guest device 3 to a home or wired network. The wired home device 21-25 is a wired device located in the home, and the wireless guest device 3 is a wireless device connected to the home via the AP 1. In this exemplary embodiment, the wired home device 21-25 may be understood to indicate one of the wired home devices 21-25 illustrated in FIG. 1 but it is not limited thereto.

In particular, according to an exemplary embodiment of the present invention, when a user simply brings the wireless guest device 3 near to or into contact with the AP 1 or the wired device 21-25, the wireless guest device 3 and the AP 1 or the wired home device 21-25 exchange information for connecting to a wireless network, for securing the wireless network, executing an application via a Limited Distance Communication (LDC) channel, and exchange content to be used for executing the application via a wire/wireless network channel. Thus, the wireless guest device 3 can not only automatically optimally set a wireless network security environment but also execute an application that the user desires.

The LDC indicates a communication method of transmitting and receiving a small amount of data within a short distance of 10 centimeters or less in a contact manner or a contactless manner. Examples of the LDC method are Infrared in Data Association (IrDA), Near Field Communication (NFC), Bluetooth, Smart Card, Radio Frequency IDentification (RFID), etc. As described above, the communication distance and bandwidth of the LDC method is far less than those of a wired network or a wireless network, and thus, the wireless guest device 3 and the AP 1 or the wired home device 21-25 cannot exchange a large amount of data, such as video content and audio content, via the LDC channel. Thus, according to an exemplary embodiment of the present invention, the wireless guest device 3 and the AP 1 or the wired home device 21-25 exchange content to be used to execute an application via a wire/wireless network channel.

Figure 2:
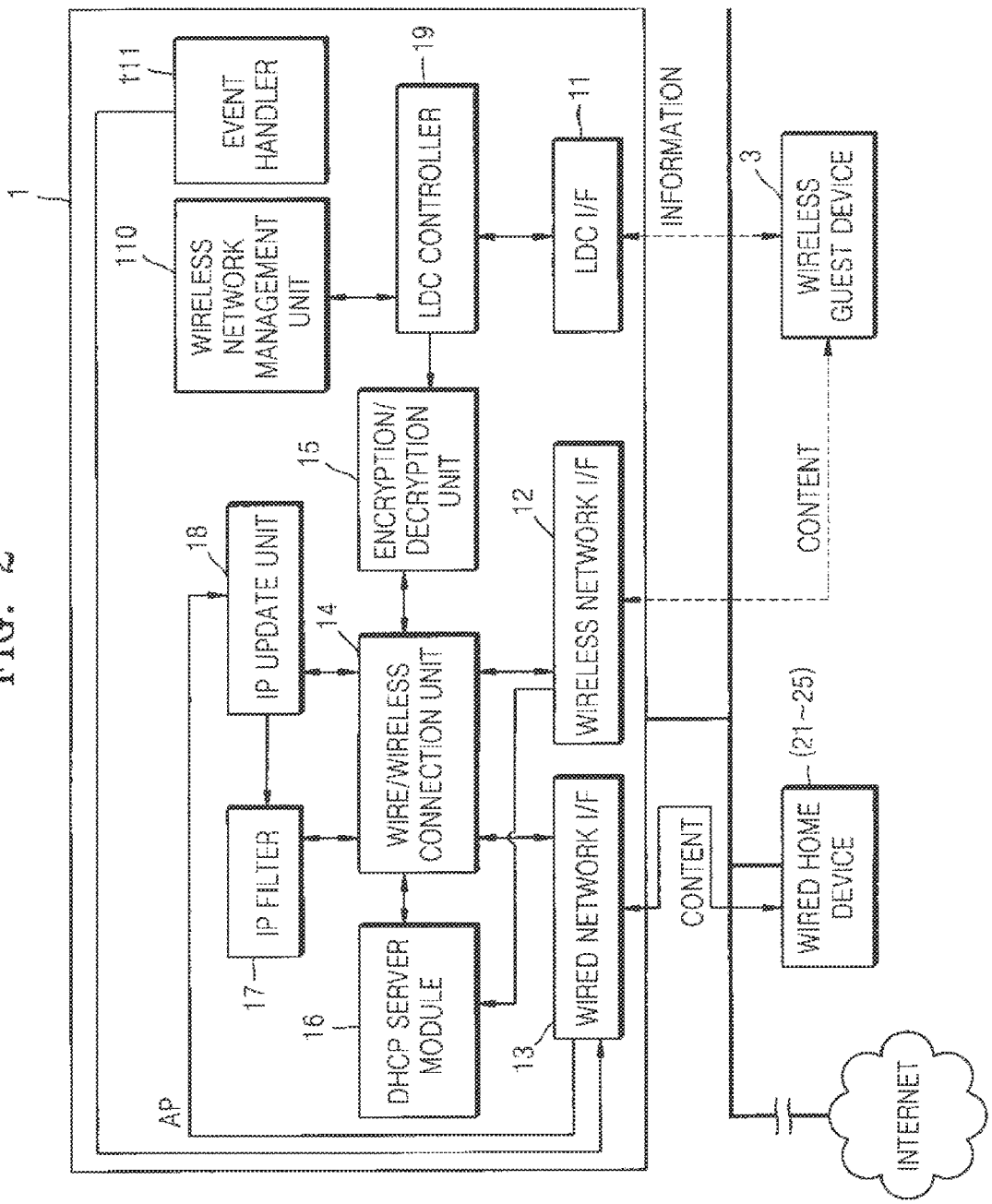
FIG. 2 is a block diagram of an access point of the home system, according to an exemplary embodiment of the present invention.

FIG. 2 is a block diagram of an AP 1 of the home system of FIG. 1, according to an exemplary embodiment of the present invention. Referring to FIG. 2, the AP 1 includes an LDC interface 11, a wireless network interface 12, a wired network interface 13, a wire/wireless connection unit 14, an encryption/decryption unit 15, a Dynamic Host Configuration Protocol (DHCP) server module 16, an Internet Protocol (IP) filter 17, an IP update unit 18, an LDC controller 19, a wireless network management unit 110, and an event handler 111.

When access of the wireless guest device 3 is sensed by the LDC interface 11, the LDC interface 11 exchanges data with the wireless guest device 3 via the LDC channel. Since the LDC interface 11 can establish only short-distance communication with the wireless guest device 3, there is little danger of the exchanged data being disclosed to another device.

Thus, the LDC interface 11 exchanges data with the wireless guest device 3 without security concerns. In particular, according to an exemplary embodiment of the present invention, when a user brings the wireless guest device 3 near to or into contact with the AP1, the LDC interface 11 transmits information for connecting to the wireless network to the wireless guest device 3, exchanges information for securing the wireless network with the wireless guest device 3, or receives information for executing an LDC application from the wireless guest device 3 via a communication channel.

In an exemplary embodiment of the present invention, the information for connecting to the wireless network is used to allow the wireless guest device 3 to access the wireless network managed by the AP 1. For example, the information for connecting to the wireless network may be a Service Set Identity (SSID) according to the Institute of Electrical and Electronics Engineers (IEEE) 802.11b standard, which represents a wireless network service that the AP 1 provides. The information for securing the wireless network is needed to secure wireless network communication between the AP 1 and the wireless guest device 3. For example, the information for securing the wireless network may be needed to generate a temporary key for encrypting data transmitted via the wireless network, i.e., the information for securing the wireless network is needed for 4-way handshaking according to the IEEE 802.11i standard. Also, the LDC application denotes an application that uses information received via the LDC channel. For example, the information for executing the LDC application may be a Uniform Resource Locator (URL) of a web site that the wireless guest device 3 will access when the user connects the wireless guest device 3 to the AP 1 to use the Internet via the wireless guest device 3.

Figure 3:
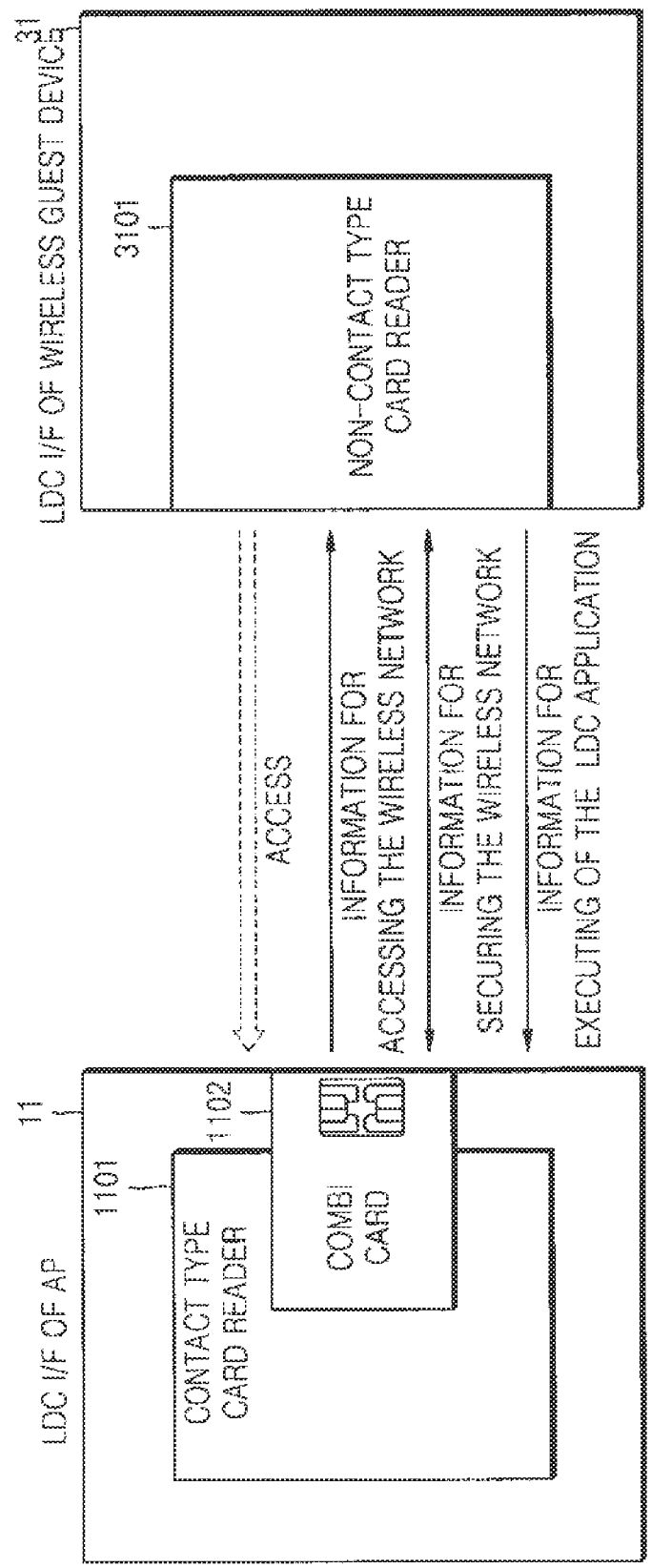
FIG. 3 is a block diagram of a Limited Distance Communication (LDC) interface of the access point and a wireless guest device, according to an exemplary embodiment of the present invention.

FIG. 3 is a block diagram of LDC interfaces 11 and 31 of the AP 1 and the wireless guest device 3 respectively, according to an exemplary embodiment of the present invention. The LDC interface 11 is embodied as a smart card. Conventionally, a smart card is a plastic card that includes a microprocessor and a memory therein, and thus can store a small amount of information. According to an exemplary embodiment of the present invention, bi-directional communication in which the LDC interface 11 of the AP 1 can read information from or write information to the LDC interface 31 of the wireless guest device 3 and vice versa must be possible.

Therefore, an LDC interface according to an exemplary embodiment of the present invention may be embodied as IrDA, NFC, or Bluetooth, that support bi-directional communication, but may also be embodied as a smart card or an RFID that supports unidirectional communication as illustrated in FIG. 3.

If the LDC interface is a smart card, only unidirectional communication is possible. Thus, the LDC interface 11 of the AP 1 includes a contact type card reader 1101 and a combi card 1102, and the LDC interface 31 of the wireless guest device 3 includes a non-contact type card reader 3101, thereby enabling bi-directional communication when using the smart card. The combi card 1102 is a smart card that includes contact-type cards according to the ISO 7816 standard and non-contact type cards according to the ISO 14443 standard. In an exemplary embodiment of the present invention, the combi card 1102 acts as an LDC medium.

Similarly, if the LDC interface is an RFID, the LDC interface 11 of the AP 1 may include an RFID reader and an RFID tag, and the LDC interface 31 of the wireless guest device 3 may include an RFID reader.

First, a case where the AP 1 provides information for connecting to the wireless network, e.g., SSID of the AP1, to the wireless guest device 3 will be described. The contact type card reader 1101 of the AP1 writes the SSID of the AP1 to the combi card 1102 of the AP 1 by using a command according to the ISO 7816 standard. When the wireless guest device 3 accesses the AP 1, the non-contact type card reader 3101 of the wireless guest device 3 recognizes the presence of the combi card 1102 by sensing a signal emitted from the combi card 1102. In this case, the non-contact type card reader 3101 of the wireless guest device 3 reads the SSID of the AP1 from the combi card 1102.

Next, a case where the AP 1 exchanges information for securing the wireless network, e.g., information for generating a temporary key according to 4-way handshaking according to the IEEE 802.11i standard, with the wireless guest device 3 will be described. In this case, the memory of the combi card 1102 of the AP 1 stores a seed key for generating the temporary key. When the wireless guest device 3 accesses the AP 1, the non-contact type card reader 3101 of the wireless guest device 3 recognizes the presence of the combi card 1102 by sensing a signal emitted from the combi card 1102. Then, the non-contact type card reader 3101 of the wireless guest device 3 reads from the combi card 1102 some of the information for generating the temporary key and the information being disclosed to the AP 1. The information for generating the temporary key may be, for example, a Media Access Control (MAC) address of the AP 1, a random number corresponding to the AP 1, etc.

Also, the non-contact type card reader 3101 of the wireless guest device 3 uses a command according to the ISO 14443 standard to write some of the information for generating the temporary key, e.g., a random number corresponding to the wireless guest device 3, etc., which is disclosed to the wireless guest device 3, to the combi card 1102. In this case, the contact type card reader 1101 of the AP1 uses a command according to the ISO 7816 standard to periodically check whether the information in the combi card 1102 has changed. If the information in the combi card 1102 has changed, the contact type card reader 1101 reads the MAC address of the wireless guest device 3, the random number corresponding to the wireless guest device 3, etc. from the combi card 1102.

A microprocessor in the combi card 1102 uses the seed key, the MAC address of the AP1, the random number corresponding to the AP 1, the random number corresponding to the wireless guest device 3, and the MAC address of the wireless guest device 3 to generate the temporary key and stores the temporary key in the memory of the combi card 1102. In this case, the non-contact type card reader 3101 of the wireless guest device 3 reads the temporary key. The temporary key is an encryption key used in only a communication session between the AP 1 and the wireless guest device 3. Thus, the temporary key is revoked when the communication session ends. The seed key is stored in a non-shared region of the memory that the non-contact type card reader 3101 of the wireless guest device 3 cannot access. Thus, unless a user allows the seed key to be allocated to the wireless guest device 3, the wireless guest device 3 cannot know the seed key. Thus, even if the communication session between the wireless guest device 3 and the AP 1 ends, the seed key does not need to be updated.

Next, a case where the wireless guest device 3 provides the AP 1 with the information for executing the LDC application, e.g., the URL of a web site, will be described. When the wireless guest device 3 accesses the AP 1, the non-contact type card reader 3101 of the wireless guest device 3 recognizes the presence of the combi card 1102 by sensing a signal emitted from the combi card 1102 of the AP1. Next, the non-contact type card reader 3101 of the wireless guest device 3 uses a command according to the ISO 14443 standard to write the URL of the web site onto the combi card 1102 of the AP1. In this case, the contact type card reader 1101 of the AP1 uses a command according to the ISO 7816 standard to periodically check whether the information in the combi card 1102 has changed. If the information in the combi card 1102 has changed, the contact type card reader 1101 reads the URL of the web site from the combi card 1102.

The wireless network interface 12 transmits and receives data via a channel of the wireless network. Here, the wireless network is a wireless local area network (LAN) according to the IEEE 802.11 standard, but it is not limited thereto. Depending on the wireless communication characteristics, data exchanged via the channel of the wireless network can also be obtained by a device that uses the same channel. Therefore, the wired home device 21-25 or the wireless guest device 3 encrypts the data by using the temporary key and transmits the encrypted data.

Thus, if the wireless network interface 12 receives content to be used for executing the LDC application from the wireless guest device 3 via a channel of a wireless LAN, the received content is encrypted content. Thus, the received content has to be decrypted and is thus transmitted to the encryption/decryption unit 15 via the wire/wireless connection unit 14. Also, the wireless network interface 12 receives the encrypted content from the encryption/decryption unit 15 via the wire/wireless connection unit 14 and transmits the encrypted content to the wireless guest device 3 via the channel of a wireless LAN. Also, when receiving a request for allocating an IP address from the wireless guest device 3 via the channel of a wireless network, the wireless network interface 12 transmits the request for allocating an IP address to the DHCP server module 16.

The wired network interface 13 exchanges data with the wired home device 21-25 via the channel of the wired network. In an exemplary embodiment of the present invention, the wired network is an Ethernet network according to the IEEE 802.3 standard, but it is not limited thereto. As described above, since the wired network interface 13 establishes wire communication with the wired home device 21-25, data is not disclosed to other devices. Thus, the wired network interface 13 exchanges data with the wired home device 21-25 without security concerns.

In particular, according to an exemplary embodiment of the present invention, when receiving a request for communicating between an IP address of the wired home device 21-25 and an IP address of the wireless guest device 3 from the wired home device 21-25 via a channel of the Ethernet network, the wired network interface 13 transmits the request to the IP update unit 18. Also, the wired network interface 13 receives content to be used to execute the LDC application from an external device accessing the Internet, or the wired home device 21-25 in a home, and transmits the content to the wire/wireless connection unit 14 via the channel of the Ethernet. Also, the wired network interface 13 receives content to be used to execute the LDC application from the wire/wireless connection unit 14, and transmits the content to the external device on the Internet or the wired home device 21-25 via the channel of the Ethernet.

The wire/wireless connection unit 14 performs conventional operations of an AP 1 according to the IEEE 802.11 standard. That is, the wire/wireless connection unit 14 connects the wireless guest device 3 to the wired network. In particular, according to an exemplary embodiment of the present invention, the wire/wireless connection unit 14 transmits content encrypted by the encryption/decryption unit 15 to the wireless network interface 12, or transmits content decrypted by the encryption/decryption unit 15 to the wired network interface 13. Also, when receiving content to be used for executing the LDC application from the wireless network interface 12, the wire/wireless connection unit 14 selectively transmits the received content according to whether the IP filter 17 gives a permission thereof, so that the content can be decrypted and transmitted according to the permission from the IP filter 17. Also, when receiving the content to be used for executing the LDC application from the wireless network interface 12, the wire/wireless connection unit 14 selectively outputs the content to the encryption/decryption unit 15 according to whether the IP filter 17 gives a permission thereof, so that the content can be encrypted and transmitted according to the permission from the IP filter 17.

When the encryption/decryption unit 15 receives content from the wire/wireless connection unit 14 via the wireless network interface 12, the encryption/decryption unit 15 decrypts the content to obtain the original content by using the temporary key read from the LDC interface 11 via the LDC controller 19, and outputs the original content to the wire/wireless connection unit 14. Also, when the encryption/decryption unit 15 receives content from the wire/wireless connection unit 14 via the wired network interface 13, the encryption/decryption unit 15 encrypts the content by using the temporary key to produce encrypted content, and outputs the encrypted content to the wire/wireless connection unit 14.

When receiving a request for allocating an IP address from a device, the DHCP server module 16 allocates the IP address to the device. In particular, according to an exemplary embodiment of the present invention, when receiving a request for allocating an IP address from the wireless guest device 3 via the wireless network interface 12, the DHCP server module 16 selectively allocates the IP address to the wireless guest device 3 as the user desires. More specifically, when the DHCP server module 16 receives a request for allocating the IP address from the wireless guest device 3, the AP 1 outputs the request to the user. If the user receives the request and permits access of the wireless guest device 3 to the home, the DHCP server module 16 allocates the IP address to the wireless guest device 3.

If the content for executing the LDC application is supplied to the wire/wireless connection unit 14, the IP filter 17 determines whether the destination of the content is a home device or an external device. If the source or the destination of the content is not an external device, it is determined that the wireless guest device 3 does not desire to use the resources of the home (the content of the wired home device 21-25), and thus, the IP filter 17 allows transmission of the content so that the wireless guest device 3 can exchange the content with the device via the Internet. If the source or the destination of the content is a home device, the IP filter 17 determines whether the destination of the content supplied to the wire/wireless connection unit 14 is the wired home device 21-25 or the wireless guest device 3.

If the destination of the content supplied to the wire/wireless connection unit 14 is the wireless guest device 3, it is determined that the wireless guest device 3 desires to use the resources of the home (the content of the wired home device 21-25), and thus, the IP filter 17 determines whether the IP address of the wireless guest device 3 is registered as a valid IP address in an IP management table updated by the IP update unit 18. If the IP address of the wireless guest device 3 is not registered as a valid IP address, the IP filter 17 does not allow the transmission of the content. Thus, the wireless guest device 3, which is not permitted to access the home, is prevented from using the content of the wired home device 21-25. If the destination of the content supplied to the wire/wireless connection unit 14 is the wired home device 21-25, it is determined that the wireless guest device 3 does not desire to use the resources of the home (the content of the wired home device 21-25), and thus, the IP filter 17 does not determine whether the IP address of the wireless guest device 3 is registered as a valid IP address.

If the IP address of the wireless guest device 3 is registered as a valid IP address or the destination of the content supplied to the wire/wireless connection unit 14 is the wired home device 21-25, the IP filter 17 determines whether to permit transmission of the content, based on the IP address of the transmitter (the wired home device 21-25 or the wireless guest device 3) and the IP address of the destination (the wired home device 21-25 or the wireless guest device 3). That is, if in the IP management table updated by the IP update unit 18, the IP address of the transmitter (the wired home device 21-25 or the wireless guest device 3) is registered to correspond to that of the destination (the wired home device 21-25 or the wireless guest device 3), the IP filter 17 permits the transmission of the content. If so, the IP filter 17 does not permit the transmission of the content, and the content can be shared only between two devices authorized by the user.

The IP update unit 18 updates the IP management table by registering the IP address, which is allocated by the DHCP server module 16, as a valid IP address in the IP management table. Also, when receiving a request for permission to establish communication between the IP address of the wired home device 21-25 and the IP address of the wireless guest device 3 from the wired home device 21-25 via the wired network interface 12, the IP update unit 18 updates the IP management table by registering these IP addresses to correspond to each other in the IP management table.

FIG. 4 is a diagram of an IP management table according to an exemplary embodiment of the present invention. Referring to FIG. 4, the IP management table is comprised of a plurality of entries, each entry including a wireless guest device IP address field 41, a valid field 42, and a wired home device IP address field 43.

When the DHCP server module 16 allocates an IP address to the wireless guest device 3 of FIG. 3, the IP update unit 18 records the IP address in the wireless guest device IP address field 41, and a value of 1 in the valid field 42 representing that the IP address is valid. Also, upon receiving a request for permission to establish communication between the IP address of the wired home device 21-25 and the IP address of the wireless guest device 3 from the wire/wireless connection unit 14, the IP update unit 18 determines whether the IP address of the wireless guest device 3 has been registered as a valid IP address in the IP management table. If it is determined that the IP address of the wireless guest device 3 has already been registered as a valid IP address, the IP update unit 18 records the IP address of the wired home device 21-25 in the wired home devices IP address field 43 corresponding to the wireless guest device IP address field 41 recording the IP address of the wireless guest device 3. Otherwise, the IP update unit 18 records the IP address of the wireless guest device 3 in the wireless guest device IP address field 41 and the IP address of the wired home device 21-25 in the wired home device IP address field 43.

The LDC controller 19 reads information from or writes information to the LDC interface 11. More specifically, the LDC controller 19 reads a temporary key from the combi card 1102 of the LDC interface 11 and outputs the temporary key to the encryption/decryption unit 15. Also, the LDC controller 19 reads a seed key from the combi card 1102 and outputs the seed key to the event handler 111. Also, when receiving information for accessing a wireless network or information for securing the wireless network, e.g., the SSID of the AP 1 or the seed key, from the wireless network management unit 110, the LDC controller 19 writes the received information to the combi card 1102.

The wireless network management unit 110 determines whether the information for accessing the wireless network or the information for securing the wireless network has changed, and updates the information for accessing the wireless network (or information for securing the wireless network), which is stored in the LDC interface 11, with the changed information via the LDC controller 19. For example, when the SSID of the AP 1 in the home or a seed key, which is shared by home devices, is changed, the wireless network management unit 110 replaces the SSID of the AP 1 stored in the combi card 1102 of the LDC interface 11 with the changed SSID or replaces the seed key stored in the combi card 1102 with the changed seed key via the LDC controller 19. If a new wireless guest device enters the home and the user desires to use the new wireless guest device for an extended period of time in the wireless home, the wireless network management unit 110 temporarily writes a seed key stored in a non-shared region of the memory of the combi card 1102 of the LDC interface 11 into a shared region via the LDC controller 19.

The event handler 111 determines whether the information to access the wireless network or the information for securing the wireless network has changed. When it is determined that the information has changed, the event handler 111 transmits to the wired home device 21-25 an event message that instructs updating the information for accessing access the wireless network or the information for securing the wireless network, via the wireless network interface 13 (a channel of a wired network). Conventionally, the event handler 111 can transmit event messages based on the Universal Plug and Play (UPnP) standard. For example, when the SSID of the AP 1 in the home, or a seed key shared by home devices is changed, the event handler 111 transmits an event message containing a new SSID or a new seed key. If a wired home device is installed into the home, the event handler 111 reads the seed key from the combi card 1102 of the LDC interface 111 and transmits an event message containing the read seed key via the LDC controller 19.

Figure 5:
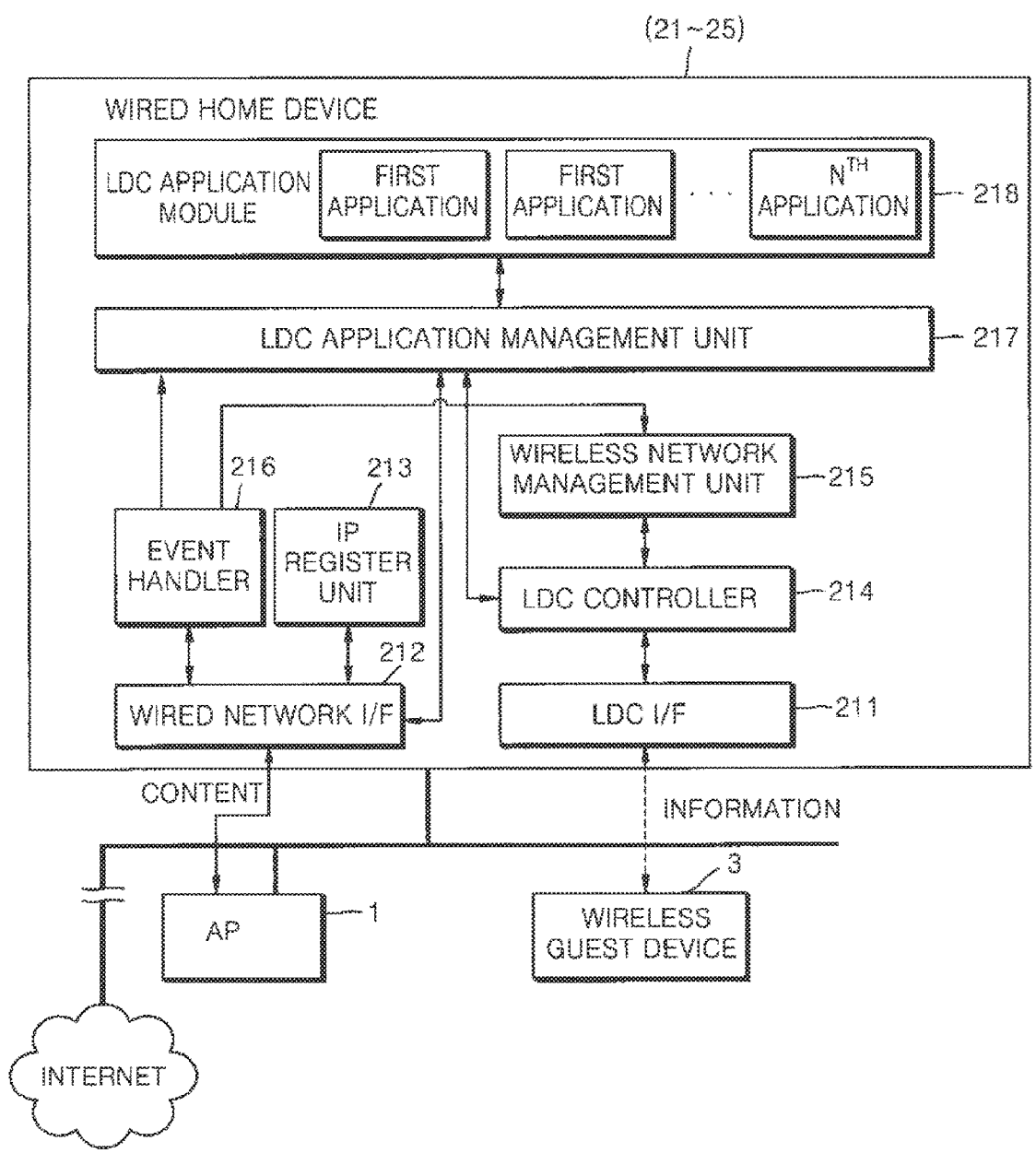
FIG. 5 is a block diagram of wired home devices of the home system, according to an exemplary embodiment of the present invention.

FIG. 5 is a block diagram of wired home devices according to an exemplary embodiment of the present invention. Referring to FIG. 5, the wired home device 21-25 of FIG. 1 include an LDC interface 211, a wired network interface 212, an IP register unit 213, an LDC controller 214, a wireless network management unit 215, an event handler 216, an LDC application management unit 217, and an LDC application module 218.

When sensing access by the wireless guest device 3, the LDC interface 211 exchanges data with the wireless guest device 3 via an LDC channel. In particular, according to an exemplary embodiment of the present invention, when a user connects the wireless guest device 3 to the wired home device 21-25, the LDC interface 211 transmits information for accessing the wireless network to the wireless guest device 3, exchanges information for securing the wireless network with the wireless guest device 3, receives information for executing the LDC application from the wireless guest device 3, or transmits the information for executing the LDC application to the wireless guest device 3, via the LDC channel. The LDC application shared between the wired home device 21-25 and the wireless guest device 3 may be a UPnP Audio Visual (AV) application. If the LDC application is the UPnP AV application, and thus, when the wireless guest device 3 is a Control Point (CP) according to the UPnP standard and the audio system 21 is a Controlled Device (CD) according to the UPnP standard, the information for executing the LDC application may be a control URL that records information that allows the wireless guest device 3 to control the audio system 21, or a session information of audio content that is being reproduced by the audio system 21, that is, information indicating an instant of time when the audio content is reproduced. The above operations of the LDC interface 211 are performed to allow the user to bring the wireless guest device 3 in contact with the audio system 21 that is reproducing the audio content, so that the wireless guest device 3 can continuously reproduce the audio content. If the user brings the wireless guest device 3, which is reproducing the audio content, in contact with the audio system 21 so that the audio system 21 can continuously reproduce the audio content, the audio system 21 acts as a CP and the wireless guest device 3 acts as a CD.

Figure 6:
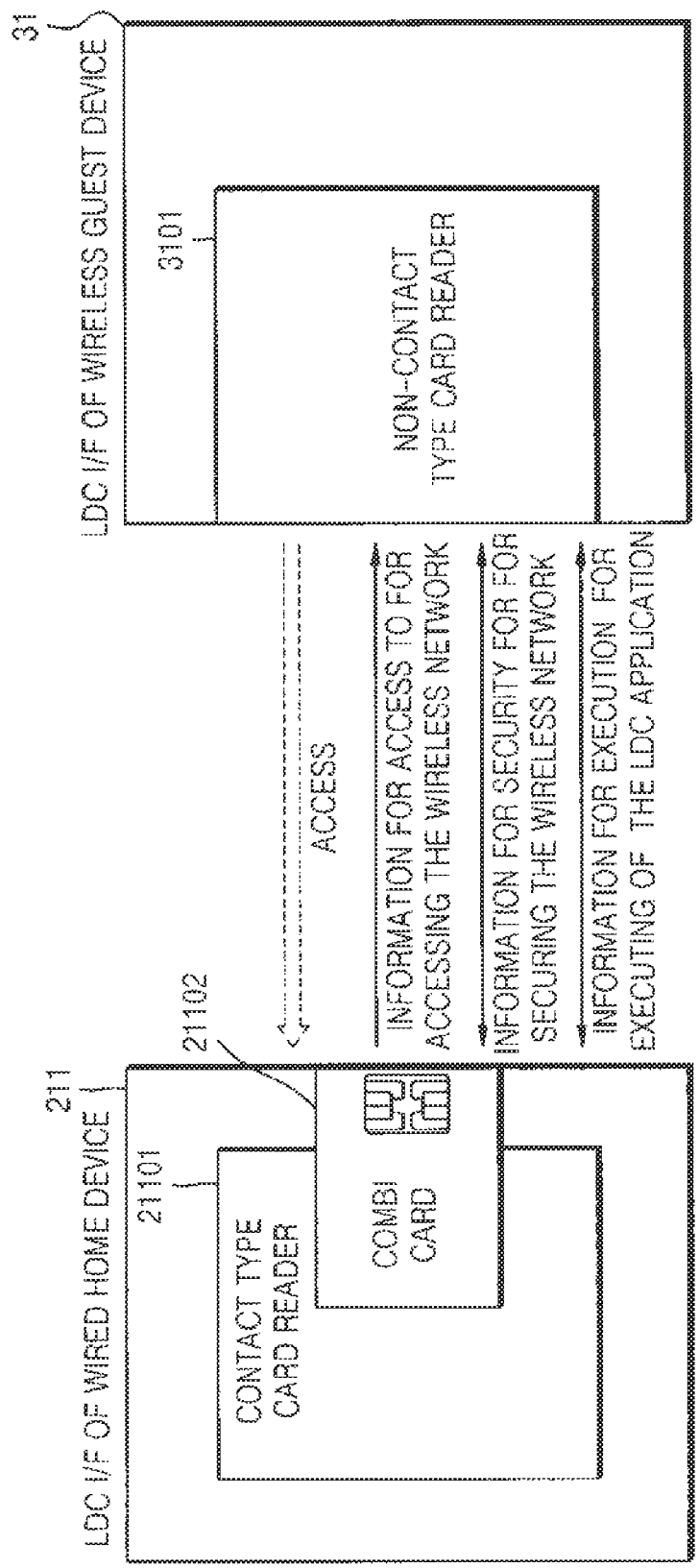
FIG. 6 is a block diagram of an LDC interface of the wired home device of the home system, according to an exemplary embodiment of the present invention.

FIG. 6 is a block diagram of an LDC interface 211 of the wired home device according to an exemplary embodiment of the present invention. Referring to FIG. 6, the LDC interface 211 is a smart card that embodies the LDC interface 211 illustrated in FIG. 5. The LDC interface 211 of FIG. 6 similar to the LDC interface 11 of FIG. 3, but further allows the wired home device 21-25 to provide information for executing the LDC application to the wireless guest device 3. That is, unlike the LDC interface 11 of the AP 1, the above operation of the LDC interface 211 of FIG. 6 is based on that the wired home device 21-25 including the LDC application module 218 and the LDC application that is being executed by the wired home device 21-25 being continuously executed by the wireless guest device 3.

First, a case where the wired home device 21-25 provides the wireless guest device 3 with information for accessing the wireless network, e.g., the SSID of the AP 1 will be described. A contact type card reader 21101 of the wired home device 21-25 writes the SSID of the wired home device 21-25 to a combi card 21102 by using a command according to the ISO 7816 standard. When the wireless guest device 3 accesses the wired home device 21-25, a non-contact type card reader 3101 of the wireless guest device 3 senses a signal emitted from the combi card 21102 to recognize the presence of the combi card 21102. In this case, the non-contact type card reader 3101 reads the SSID of the wired home device 21-25 from the combi card 21102 of the wired home device 21-25.

Next, the wired home device 21-25 exchange information for securing the wireless network, e.g., information for generating a temporary key or 4-way handshaking according to the IEEE 802.11i standard, with the wireless guest device 3 will be described. In this case, the memory of the combi card 21102 of the wired home device 21-25 stores a seed key for generating the temporary key. When the wireless guest device 3 accesses the wired home device 21-25, the non-contact type card reader 3101 of the wireless guest device 3 recognizes the presence of the combi card 21102 by sensing a signal emitted from the combi card 21102 of the wired home device 21-25. In this case, the non-contact type card reader 3101 of the wireless guest device 3 reads from the combi card 21102 information for generating the temporary key, which is disclosed by the wired home device 21-25. This information can be, for example, an MAC address of the wired home device 21-25 or a random number corresponding to the wired home device 21-25.

Also, the non-contact type card reader 3101 of the wireless guest device 3 uses a command according to the ISO 14443 standard to write information for generating the temporary key, e.g., a random number corresponding to the wireless guest device 3, onto the combi card 21102 of the wired home device 21-25. In this case, the contact type card reader 21101 of the wired home device 21-25 uses a command according to the ISO 7816 standard to periodically determine whether the information in the combi card 21102 has changed. If it is determined that the information in the combi card 21102 has changed, the contact type card reader 21101 reads the MAC address of the wireless guest device 3, the random number corresponding to the wireless guest device 3, etc., from the combi card 21102.

A microprocessor in the combi card 21102 uses the seed key, the MAC address of the wired home device 21-25, the random number corresponding to the wired home device 21-25, the random number corresponding to the wireless guest device 3, and the MAC address of the wireless guest device 3 to generate the temporary key. The generated temporary key is a temporary encryption key used only during a communication session between the wired home device 21-25 and the wireless guest device 3. Thus, the temporary key is removed when the communication session ends. In particular, the seed key is stored in a non-shared region of the memory that the non-contact type card reader 3101 of the wireless guest device 3 cannot access. Thus, the seed key is not disclosed to the wireless guest device 3 and does not need to be updated, even if the communication session between the wired home device 21-25 and the wireless guest device 3 ends.

Next, a case where the wired home device 21-25 provides the wireless guest device 3 with information for executing the LDC application, e.g., a control URL that records information for controlling the audio system 21, session information of audio content that is being reproduced by the audio system 21, etc., will be described. The contact type card reader 21101 of the wired home device 21-25 uses a command according to the ISO 7816 standard to write the control URL, the session information, etc. onto the combi card 21102. When the wireless guest device 3 accesses the wired home device 21-25, the non-contact type card reader 3101 of the wireless guest device 3 recognizes the presence of the combi card 21102 by sensing a signal emitted from the combi card 21102 of the wired home device 21-25. In this case, the non-contact type card reader 3101 of the wireless guest device 3 reads the control URL and the session information from the combi card 21102 of the wired home device 21-25.

Next, a case where the wireless guest device 3 provides the wired home device 21-25 with the information for executing the LDC application, e.g., a control URL that records information for controlling the wireless guest device 3, session information of audio content that is being reproduced by the wireless guest device 3, etc., will be described. When the wireless guest device 3 accesses the wired home device 21-25, the non-contact type card reader 3101 of the wireless guest device 3 recognizes the presence of the combi card 21102 by sensing a signal emitted from the combi card 21102 of the wired home device 21-25. Next, the non-contact type card reader 3101 of the wireless guest device 3 uses a command according to the ISO 14443 standard to write the control URL and the session information onto the combi card 21102 of the wired home device 21-25. In this case, the contact type card reader 21101 of the wired home device 21-25 uses a command according to the ISO 7816 standard to periodically determine whether the information in the combi card 21102 has changed. If it is determined that the information in the combi card 21102 has changed, the contact type card reader 21101 reads the control URL and the session information from the combi card 21102.

The wired network interface 212 exchanges data with the wired home device 21-25 via a channel of the wired network. In particular, according to an exemplary embodiment of the present invention, upon receiving a request for permission to establish a connection between the IP address of the wired home device 21-25 and the IP address of the wireless guest device 3 from the IP register unit 213, the wired network interface 212 transmits the request to the AP 1 via the channel of the wired network. Also, upon receiving content to be used for executing the LDC application from the AP 1 via the channel of the wired network, the wired network interface 212 transmits the content to the LDC application management unit 217. Also, upon receiving content to be used for executing the LDC application from the LDC application management unit 217, the wired network interface 212 transmits the content to the AP 1 via the channel of the wired network.

Upon receiving the MAC address of the wireless guest device 3 from the LDC controller 214, the IP register unit 213 outputs a request for an admission to establish a connection between the IP address of the wired home device 21-25 and the IP address of the wireless guest device 3, which corresponds to the MAC address of the wireless guest device 3, to the wired network interface 212. The request is a message that contains the IP address of the wired home device 21-25 and the IP address of the wireless guest device 3. The request is made to prevent the wireless guest device 3 from using the content stored in the other wired home device 21-25, while allowing the wireless guest device 3 to use only the one of the intended wired home device 21-25 that the user desires to access.

The LDC controller 214 reads information from or writes information to the LDC interface 211. More specifically, when receiving information for accessing the wireless network or the information for securing the wireless network, e.g., the SSID of the AP 1 or the seed key, from the wireless network management unit 215, the LDC controller 214 writes the received information to the combi card 21102 of the LDC interface 211. Also, when information for executing the LDC application, e.g., the session information of the audio content, is received from the LDC application management unit 217, the LDC controller 214 writes the received information to the combi card 21102 of the LDC interface 211.

Upon receiving information for accessing the wireless network or information for securing the wireless network from the event handler 216, the wireless network management unit 215 updates the information for accessing the wireless network or the information for securing the wireless network, which are stored in the LDC interface 211 with the received information. For example, when receiving the SSID of the AP 1 or the seed key from the event handler 216, the wireless network management unit 215 replaces the SSID stored in the combi card 21102 of the LDC interface 211 with the received SSID via the LDC controller 214 or replaces the seed key stored in the combi card 21102 with the received seed key. Also, the wireless network management unit 215 outputs the information for securing the wireless network, e.g., information for 4-way handshaking according to the IEEE 802.11i standard, to the LDC controller 214.

When receiving an event containing information for accessing the wireless network or information for securing the wireless network to be updated from the AP 1 via the wired network interface 212, the event handler 216 outputs information contained in the event to the LDC application management unit 217 or the wireless network management unit 215. In general, the event handler 216 can receive events according to the UPnP standard. For example, when the SSID of the AP 1 in a home has changed, the event handler 216 receives an event that contains the changed SSID, and outputs event information to the LDC application management unit 217. If a seed key shared by home devices has changed, the event handler 216 receives the event that contains the changed seed key, and outputs the event information to the wireless network management unit 215. If the wired home device 21-25 are newly installed internally, the event handler 216 receives an event that contains the seed key shared by the existing home devices, and outputs the event information to the wireless network management unit 215.

When the LDC application management unit 217 receives information for executing the LDC application from the LDC interface 211 and receives content for executing the LDC application from the wired network interface 212, the LDC application management unit 217 executes one of the corresponding applications stored in the LDC application module 218, in order to process the content based on the information for executing the LDC application. Also, the LDC application management unit 217 determines whether the information for executing the LDC application, which is being executed by LDC application module 218, has changed. If it is determined that the information for executing the LDC application has changed, the LDC application management unit 217 outputs this information to the LDC controller 214. Also, when the LDC application management unit 217 recognizes via the LDC controller 214 that the content must be transmitted from the wired home device 21-25 to the wireless guest device 3 via the AP 1, i.e., when it recognizes that the information for executing the LDC application is transmitted to the wireless guest device 3 via the LDC channel, the LDC application management unit 217 extracts content to be used when another device continuously executes the LDC application that is being executed by the LDC application module 218, and outputs the extracted content to the wired network interface 212.

The LDC application module 218 processes the content based on the information for executing the LDC application according to the operation result of the LDC application management unit 217. For example, when a user brings the wireless guest device 3, which is reproducing audio content, near to or in contact with the audio system 21 in order to allow the audio system 21 to continuously reproduce the audio content of the wireless guest device 3, the LDC application module 218 reproduces the audio content based on session information of the audio content that is being reproduced by the wireless guest device 3, i.e., information indicating an instant of time when the audio content is reproduced.

Figure 7:
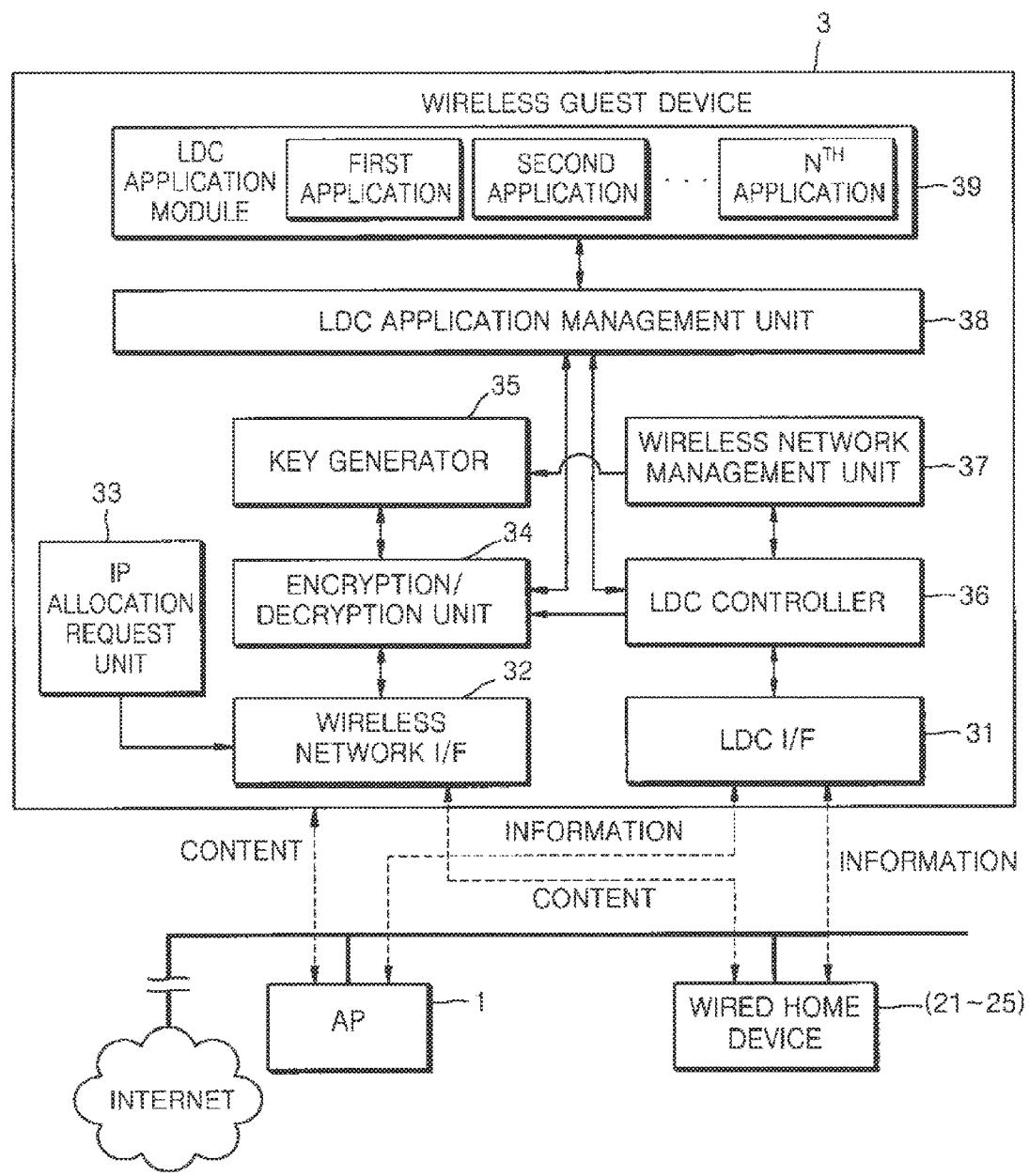
FIG. 7 is a block diagram of the wireless guest device according to an exemplary embodiment of the present invention.

FIG. 7 is a block diagram of a wireless guest device 3 of the home system, according to an exemplary embodiment of the present invention. Referring to FIG. 7, the wireless guest device 3 includes an LDC interface 31, a wireless network interface 32, an IP allocation requesting unit 33, an encryption/decryption unit 34, a key generator 35, an LDC controller 36, a wireless network management unit 37, an LDC application management unit 38, and an LDC application module 39.

The LDC interface 31 accesses an AP 1 or wired home device 21-25 to exchange data with the AP 1 or the wired home device 21-25 via an LDC channel. In particular, according to an exemplary embodiment of the present invention, when a user brings the wireless guest device 3 near to or in contact with the AP 1 or the wired home device 21-25, the LDC interface 211 receives information for accessing a wireless network from the AP 1 or the wired home device 21-25 via the LDC channel, exchanges information for securing the wireless network with the AP 1 or the wired home device 21-25, receives information for executing an LDC application from the AP 1 or the wired home device 21-25, or transmits the information for executing the LDC application to the AP 1 or the wired home device 21-25. The LDC interface 31 has been described above with reference to FIG. 3 and FIG. 6.

The wireless network interface 32 transmits and receives data via a channel of the wireless network. In particular, according to an exemplary embodiment of the present invention, when receiving a request for allocating an IP address from the IP allocation requesting unit 33, the wireless network interface 32 transmits the request to the AP 1 via the channel of the wireless network. Also, when receiving content to be used for executing the LDC application from the AP 1 or the wired home device 21-25 via the channel of the wireless network, the wireless network interface 32 transmits the content to the encryption/decryption unit 34, which decrypts the content. Also, the wireless network interface 32 receives encrypted content from the encryption/decryption unit 34, and transmits the received encrypted content to the AP 1 or the wired home device 21-25 via the channel of the wireless network.

If the wireless guest device 3 first enters a home, the IP allocation requesting unit 33 transmits a request for allocating an IP address to the wireless network interface 32.

When receiving content to be used for executing the LDC application from the wireless network interface 32, the encryption/decryption unit 34 obtains the original content by decrypting the content using a temporary key that is read from the LDC interface 31 via the LDC controller 36 or generated by the key generator 35, and outputs the original content to the LDC application management unit 38. Also, when receiving content to be used for executing the LDC application from the LDC application management unit 38, the encryption/decryption unit 34 encrypts the content by using the temporary key, and outputs the encrypted content to the wireless network interface 32.

When receiving a seed key from the wireless network management unit 37, the key generator 35 exchanges information for securing the wireless network with the AP 1 or the wired home device 21-25 through 4-way handshaking according to the IEEE 802.11i standard. Next, the key generator 35 generates the temporary key based on the seed key and the information for securing the wireless network. When the user desires to use a home wireless network with respect to the wireless guest device 3 for an extended period of time, the temporary key is generated by the key generator 35. Therefore, the wireless guest device 3 obtains the seed key from the AP 1 or the wired home device 21-25. However, if the user desires to temporarily use the home wireless network with respect to the wireless guest device 3, the wireless guest device 3 obtains the temporary key from the AP 1 or the wired home device 21-25. That is, in this case, in order not to disclose the seed key to the wireless guest device 3, the AP 1 or a combi card of the wired home device 21-25 generates the temporary key, in place of the wireless guest device 3.

The LDC controller 36 reads information from or writes information to the LDC interface 31. More specifically, the LDC controller 36 reads the temporary key from the AP 1 or the combi card of an LDC interface of the wired home device 21-25 via the LDC interface 31, and outputs the temporary key to the encryption/decryption unit 34. The LDC controller 36 reads the seed key from the AP 1 or the combi card of the LDC interface of the wired home device 21-25 via the LDC interface 31, and outputs the seed key to the wireless network management unit 37. Also, when receiving the information for securing the wireless network, such as information for 4-way handshaking according to the IEEE 802.11i standard, from the wireless network management unit 37, the LDC controller 36 writes the received information onto the AP 1 or onto the combi card of the LDC interface of the wired home device 21-25 via the LDC interface 31. Also, the LDC controller 36 reads the information for securing the wireless network, such as information for 4-way handshaking according to the IEEE 802.11i standard, from the AP 1 or the combi card of the LDC interface of the wired home device 21-25 via the LDC interface 31, and outputs the read information to the wireless network management unit 37.

The wireless network management unit 37 receives information for accessing the wireless network and the information for securing the wireless network from the LDC controller 36, and sets a wireless network access environment and a wireless network security environment based on the received information. For example, if the SSID of the AP 1 or the seed key from the LDC controller 36 is received, the wireless network management unit 37 sets a wireless network access environment that uses the SSID of the AP 1 and a wireless network security environment that uses the seed key. In particular, the wireless network management unit 37 outputs the seed key and the information for securing the wireless network, which are received from the LDC controller 36, to the key generator 35. Also, the wireless network management unit 37 outputs the information for securing the wireless network, such as the information for 4-way handshaking according to the IEEE 802.11i standard, to the LDC controller 36.

When the LDC application management unit 38 receives information for executing an LDC application from the LDC interface 31 and content for executing the LDC application from the encryption/decryption unit 34, the LDC application management unit 38 executes one of the corresponding applications stored in the LDC application module 39, so as to process the content based on the information for executing the LDC application. Also, the LDC application management unit 38 extracts information for executing the LDC application that is being executed by the LDC application module 39, and outputs the extracted information to the LDC controller 36. Also, the LDC application management unit 38 extracts content to be used when the LDC application, which is being executed by the LDC application module 39, is continuously being executed by another device, and outputs the extracted content to the encryption/decryption unit 34.

The LDC application module 39 processes the content based on the information for executing the LDC application according to the operation result of the LDC application management unit 38. For example, when the user brings the wireless guest device 3 in contact with the audio system 21 that is reproducing audio content in order to allow the audio system 21 to continuously reproduce the audio content, the LDC application module 39 reproduces the audio content based on session information of the audio content that is being reproduced by the audio system 21, that is, information indicating an instant of time when the audio content is reproduced.

Figure 8A:
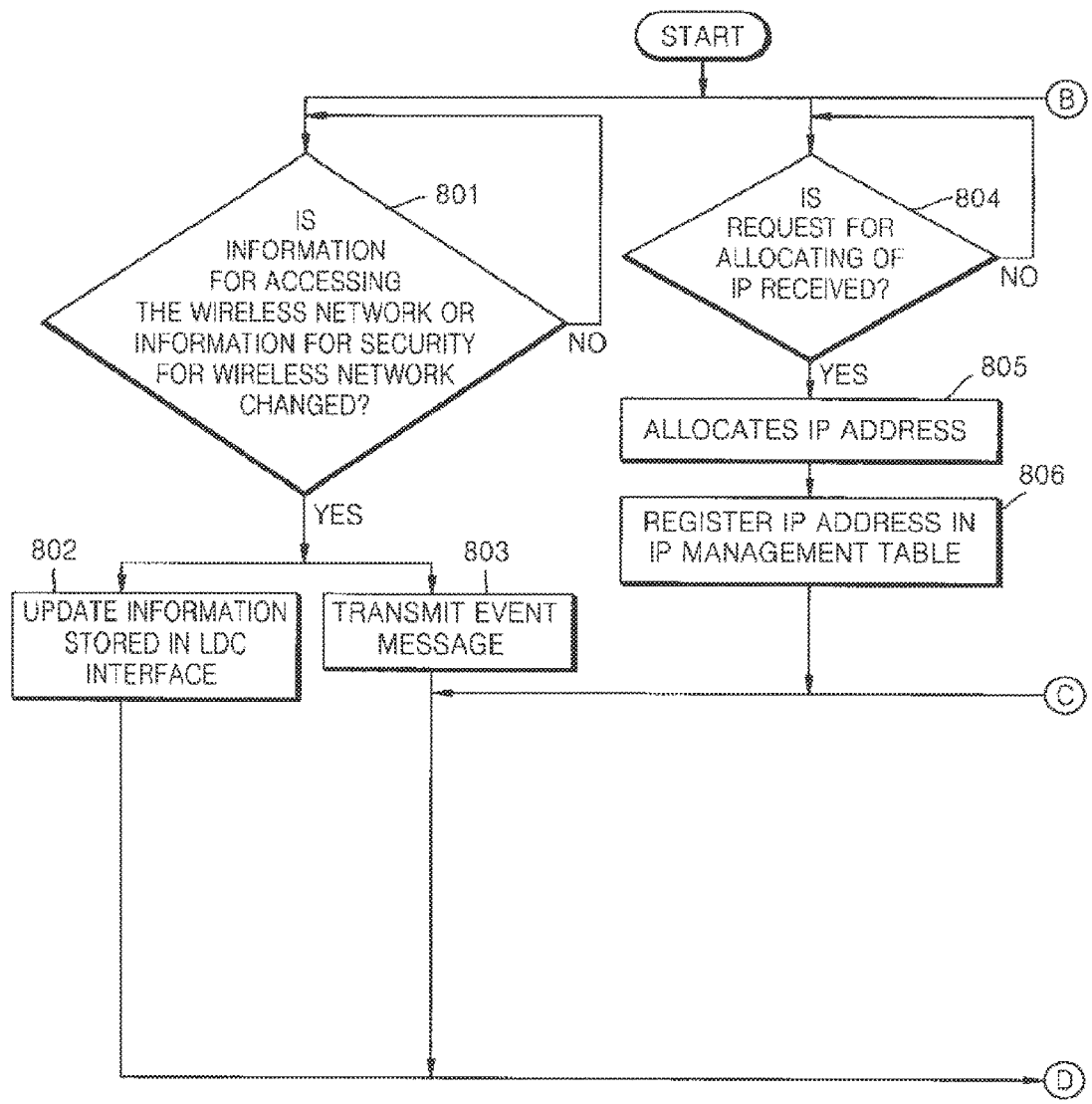
FIGS. 8A through 8C are flowcharts illustrating a method of relaying an LDC application that is being executed by using the access point, according to an exemplary embodiment of the present invention.
Figure 8B:
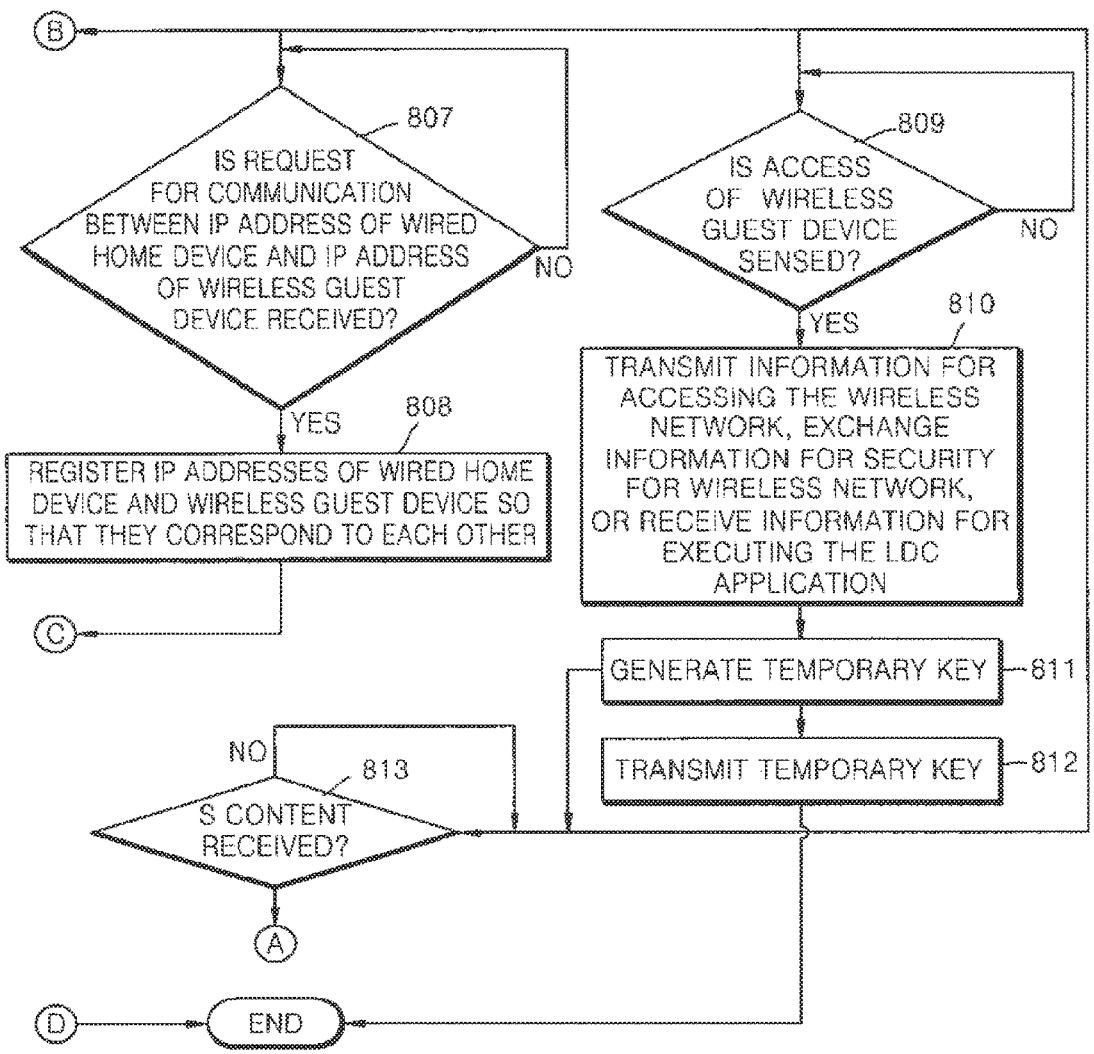
Figure 8C:
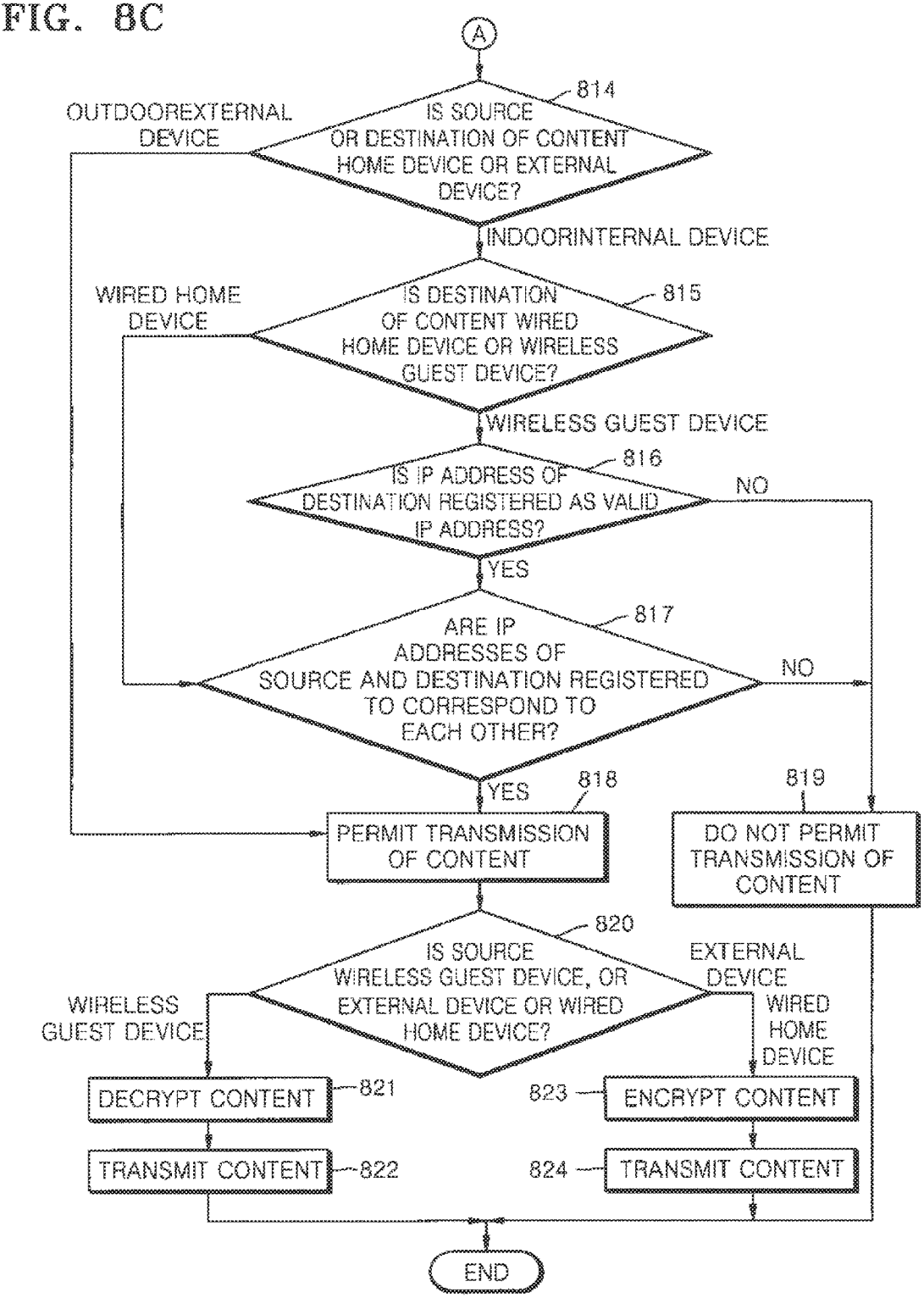

FIGS. 8A through 8C are flowcharts illustrating a method of relaying an LDC application that is being executed of the access point according to an exemplary embodiment of the present invention. Referring to FIGS. 8A through 8C, the method includes operations performed by the AP 1 of FIG. 2. Thus, although not described herein, the operations of the AP 1 described above with reference to FIG. 2 are also applied to the method of FIGS. 8A through 8C.

In operation 801, the AP 1 determines whether information for accessing a wireless network or information for securing the wireless network has changed, and performs operations 802 and 803 when it is determined that the information for accessing the wireless network or the information for securing the wireless network has changed.

In operation 802, the AP 1 updates the information stored in the LDC interface 11 by using the information determined as changed in operation 801.

In operation 803, the AP 1 transmits an event message that instructs updating the information for accessing the wireless network or information for securing the wireless network, to the wired home device 21-25 via a channel of the wired network.

In operation 804, when the AP 1 receives a request for allocating an IP address from the wireless guest device 3 via the channel of the wireless network, the AP1 performs operation 805.

In operation 805, the AP 1 selectively allocates the IP address from the wireless guest device 3 according to a user's selection.

In operation 806, the AP 1 registers the IP address allocated in operation 805 as a valid IP address in an IP management table to update the IP management table.

In operation 807, when the AP 1 receives a request for communicating between an IP address of the wired home device 21-25 and an IP address of the wireless guest device 3 from the wired home device 21-25 via the channel of the wired network, the AP1 performs operation 808.

In operation 808, the AP 1 updates the IP management table by registering the IP address of the wired home device 21-25 and the IP address of the wireless guest device 3 in the IP management table so that the IP addresses correspond to each other.

In operation 809, when the AP 1 senses access of the wireless guest device 3 thereto, the AP1 performs operation 810.

In operation 810, the AP 1 transmits the information for accessing the wireless network to the wireless guest device 3, exchanges the information for securing the wireless network with the wireless guest device 3, or receives information for executing the LDC application from the wireless guest device 3, via an LDC channel.

In operation 811, the AP 1 generates a temporary key based on the information exchanged in operation 810 and a seed key stored in the memory of the combi card 1102.

In operation 812, the AP 1 transmits the temporary key generated in operation 811 to the wireless guest device 3 via the LDC channel.

In operation 813, when the AP 1 receives content to be used for executing the LDC application via the channel of the wireless network or the channel of the wired network, the AP1 performs operation 814.

In operation 814, the AP 1 determines whether the destination of the content received in operation 813 is a home device or an external device. If it is determined that the destination of the content is a home device, the AP1 performs operation 815. If not so, the AP1 performs operation 818.

In operation 815, the AP 1 determines whether the destination of the content received in operation 813 is the wired home device 21-25 or the wireless guest device 3. If it is determined that the destination is the wireless guest device 3, the AP1 performs operation 816. If it is determined that the destination is the wired home device 21-25, the AP1 performs operation 817.

In operation 816, the AP 1 determines whether the IP address of the wireless guest device 3 is registered as a valid IP address in the IP management table. If it is determined that the IP address of the wireless guest device 3 is registered as a valid IP address, the AP1 performs operation 817. Otherwise, the AP1 performs operation 819.

In operation 817, the AP 1 determines whether in the IP management table the IP address of the wired home device 21-25 (or the wireless guest device 3), which is the destination of the content, is registered to correspond with the IP address of the wireless guest device 3 (or the wired home device 21-25), which is the destination of the content. If it is determined that the IP addresses are registered to correspond with each other, the AP 1 performs operation 818. Otherwise, the AP 1 performs operation 819.

In operation 818, the AP 1 allows the destination of the content received in operation 813, and performs operation 820.

In operation 819, the AP 1 does not allow transmission of the content received in operation 813, and ends the method.

If it is determined in operation 820 that the transmission of the content received in operation 813 is the wireless guest device 3, the AP 1 performs operation 821. If it is determined in operation 820 that the transmitter of the content received in operation 813 is an external device on the Internet or the wired home device 21-25 in a home, the AP 1 performs operation 823.

In operation 821, the AP 1 decrypts the content received in operation 813 by using the temporary key generated in operation 811.

In operation 822, the AP 1 transmits the content decrypted in operation 821 to the external device on the Internet or the wired home device 21-25 in the home via the channel of the wired network.

In operation 823, the AP 1 encrypts the content received in operation 813 by using the temporary key generated in operation 811.

In operation 824, the AP 1 transmits the content encrypted in operation 823 to the wireless guest device 3 via the channel of the wireless network.

Figure 9A:
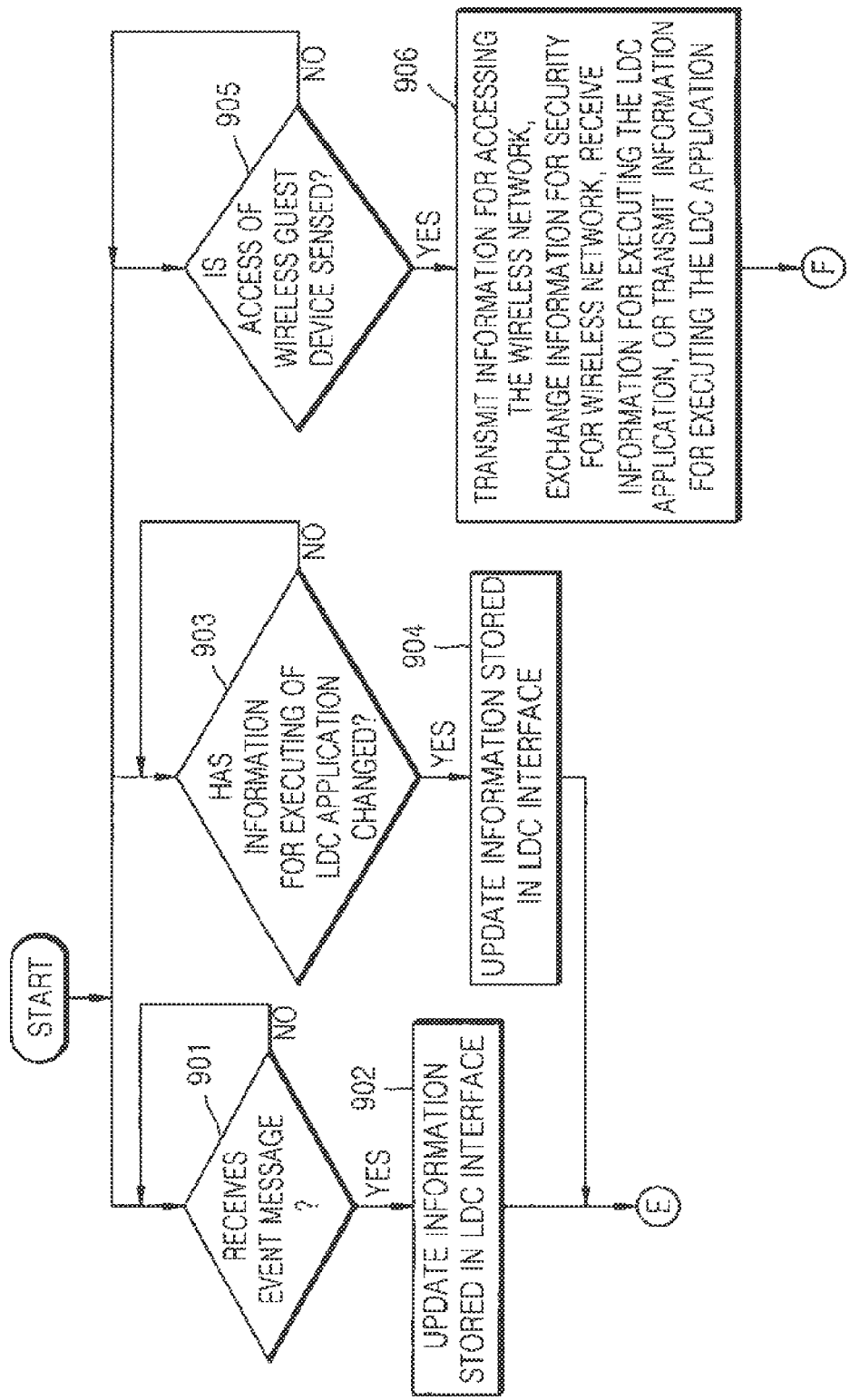
FIGS. 9A and 9B are flowcharts illustrating a method of supporting execution of an LDC application and executing the LDC application by using a wired home device, according to an exemplary embodiment of the present invention.
Figure 9B:
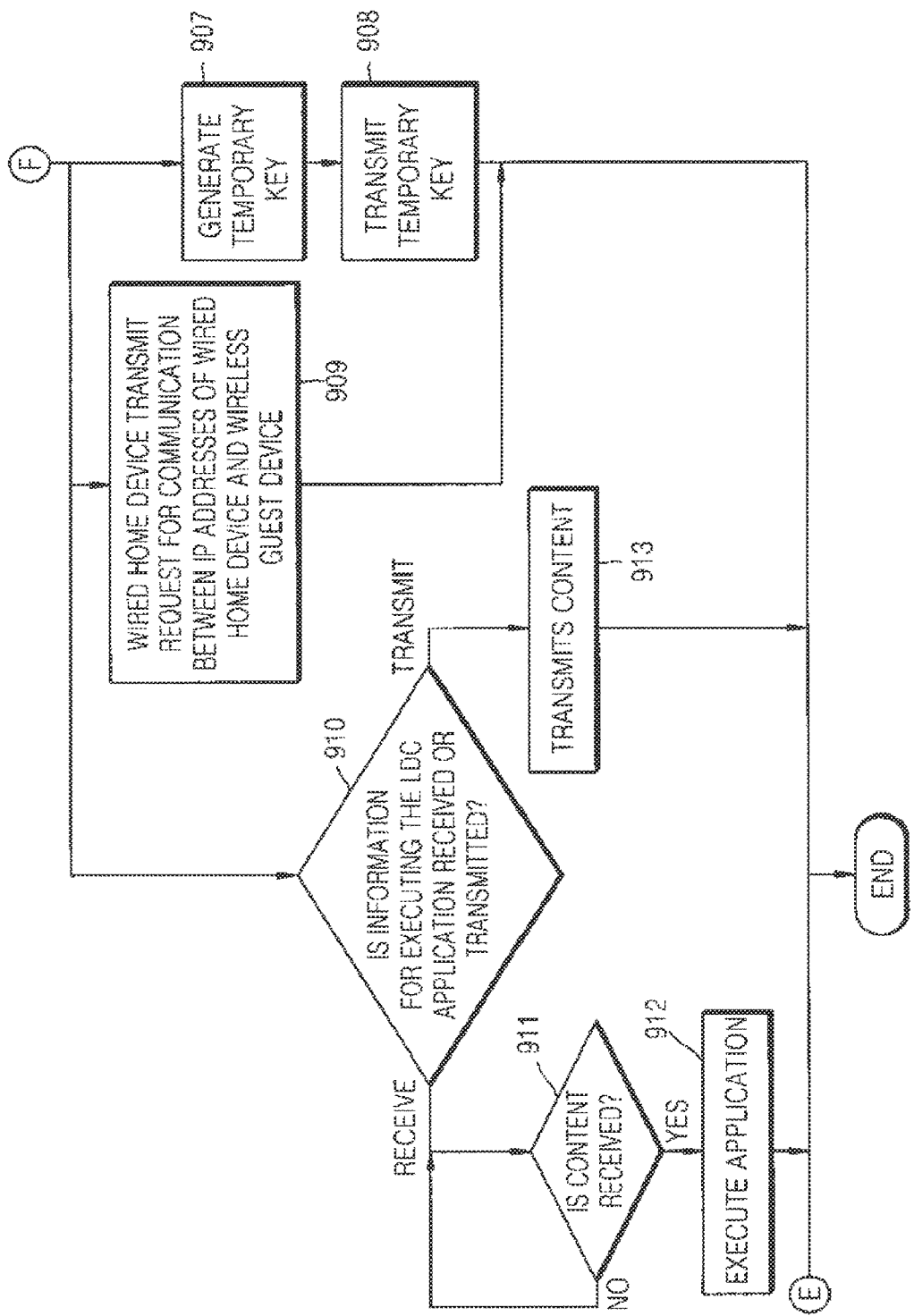

FIGS. 9A and 9B are flowcharts illustrating a method of executing an LDC application and executing the LDC application by using a wired home device, according to an exemplary embodiment of the present invention. Referring to FIGS. 9A and 9B, the method includes operations performed by the wired home device 21-25 illustrated in FIG. 5. Thus, although not described here, the operations of the wired home device 21-25 described above with reference to FIG. 5 are also applied to the method of FIGS. 9 A and 9B.

In operation 901, when the wired home device 21-25 receives an event message that instructs updating information for accessing a wireless network or information for securing the wireless network from the AP 1 via the channel of the wired network, the wired home device 21-25 performs operation 902.

In operation 902, the wired home device 21-25 updates information stored in the LDC interface 211 by using information included in the event message received in operation 901.

In operation 903, the wired home device 21-25 determines whether information for executing an LDC application that is being executed by the LDC application module 218 has changed. If it is determined that the information has changed, the AP 1 performs operation 904.

In operation 904, the wired home device 21-25 updates information stored in the LDC interface 211 by using the information determined as changed in operation 903.

In operation 905, when the wired home device 21-25 senses access of the wireless guest device 3 thereto, the wired home device 21-25 performs operation 906.

In operation 906, the wired home device 21-25 transmits information for accessing the wireless network to the wireless guest device 3, exchanges information for securing the wireless network with the wireless guest device 3, receives the information for executing the LDC application from the wireless guest device 3, or transmits the information for executing the LDC application to the wireless guest device 3, via an LDC channel.

In operation 907, the wired home device 21-25 generates a temporary key based on the information exchanged in operation 906 and a seed key stored in the memory of the combi card 1102.

In operation 908, the wired home device 21-25 transmits the temporary key generated in operation 907 to the wireless guest device 3 via the LDC channel.

In operation 909, the wired home device 21-25 transmits a request for communication between an IP address of the wired home device 21-25 and an IP address of the wireless guest device 3 corresponding to an MAC address of the wireless guest device 3, which is specified in the information exchanged in operation 906, to the AP 1 via the channel of the wired network.

In operation 910, when the wired home device 21-25 receive the information for executing the LDC application in operation 906, the wired home device 21-25 perform operation 911. In operation 910, when the wired home device 21-25 transmits the information for executing the LDC application, the wired home device 21-25 performs operation 913.

In operation 911, when the wired home device 21-25 receive content to be used for executing the LDC application via the channel of the wired network, the wired home device 21-25 perform operation 912.

In operation 912, the wired home device 21-25 executes the LDC application to process the content received in operation 911, based on the information for executing the LDC application received in operation 906.

In operation 913, the wired home device 21-25 transmits the content to be used, when the LDC application that is being executed by the LDC application module 218 is continuously being executed by another device, to the AP 1 via the channel of the wired network.

Figure 10:
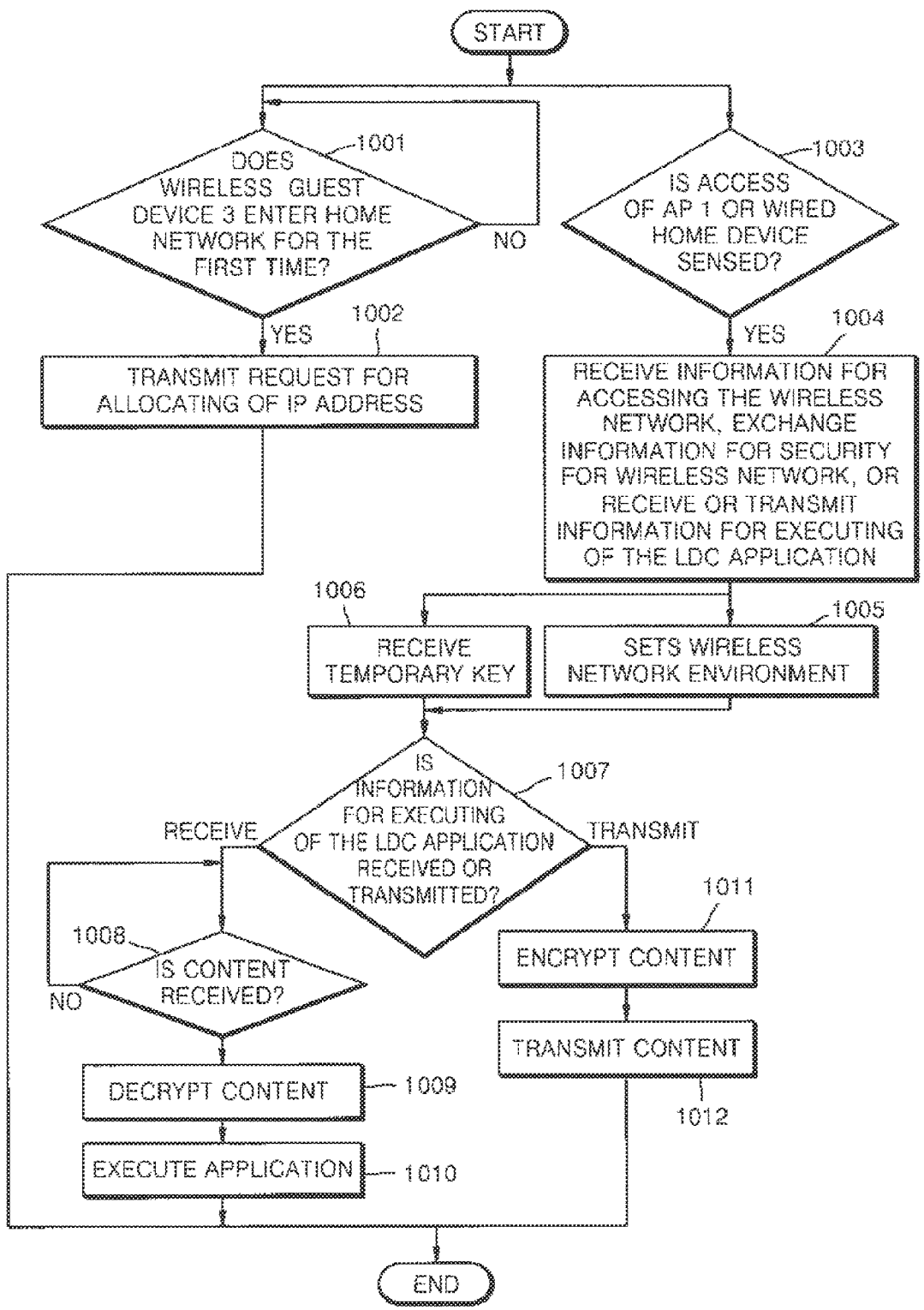
FIG. 10 is a flowchart illustrating a method of supporting executing of an LDC application and executing the LDC application by using a wireless guest device, according to an exemplary embodiment of the present invention.

FIG. 10 is a flowchart illustrating a method of supporting executing of an LDC application and executing the LDC application by using a wireless guest device, according to an exemplary embodiment of the present invention. Referring to FIG. 10, the method includes operations performed by the wireless guest device 3 of FIG. 7. Thus, although not described here, the operations of the wireless guest device 3 described above with reference to FIG. 7 are also applied to the method of FIG. 10.

In operation 1001, it is determined whether the wireless guest device 3 has entered the home for the first time.

If the wireless guest device 3 enters a home for the first time, the wireless guest device 3 performs operation 1002.

In operation 1002, the wireless guest device 3 transmits a request for allocating of an IP address to the wireless guest device 3 to the AP 1 via a channel of a wireless network.

In operation 1003, when the wireless guest device 3 senses access to the AP 1 or the wired home device 21-25 thereto, the wireless guest device 3 performs operation 1004.

In operation 1004, the wireless guest device 3 receives information for accessing the wireless network from the AP 1 or to the wired home device 21-25, exchanges information for securing the wireless network with the AP 1 or the wired home device 21-25, receives information for executing the LDC application from the AP 1 or the wired home device 21-25, or transmits information for executing the LDC application to the wired home device 21-25, via an LDC channel.

In operation 1005, the wireless guest device 3 sets a wireless network environment, based on the information for accessing the wireless network or the information for securing the wireless network, which is received in operation 1004.

In operation 1006, the wireless guest device 3 receives a temporary key, which is generated based on the information exchanged in operation 1004 and a seed key stored in the AP 1 or the memory of a combi card of the wired home device 21-25, from the AP 1 or the wired home device 21-25 via the LDC channel. If the wireless guest device 3 has the temporary key, the temporary key may be generated by the wireless guest device 3 as described above. However, for the convenience of explanation, a case where a user desires to temporarily use a home wireless network via the wireless guest device 3 will be described in this disclosure.

In operation 1007, if the wireless guest device 3 receives the information for executing the LDC application in operation 1006, the wireless guest device 3 performs operation 1008. In operation 1007, if the wireless guest device 3 transmits the information for executing the LDC application, the wireless guest device 3 performs operation 1011.

In operation 1008, when the wireless guest device 3 receives content to be used for executing the LDC application via the channel of the wireless network, the wireless guest device 3 performs 1009.

In operation 1009, the wireless guest device 3 decrypts the content received in operation 1008 by using the temporary key received in operation 1006.

In operation 1010, the wireless guest device 3 executes the LDC application to process the content decrypted in operation 1009, based on the information for executing the LDC application received in operation 1004.

In operation 1011, the wireless guest device 3 encrypts the content to be used when the LDC application that is being executed by the LDC application module 218 is continuously being executed by another device, by using the temporary key received in operation 1006.

In operation 1012, the wireless guest device 3 transmits the content encrypted in operation 1011 to the AP 1 via the channel of the wireless network.

Figure 11:
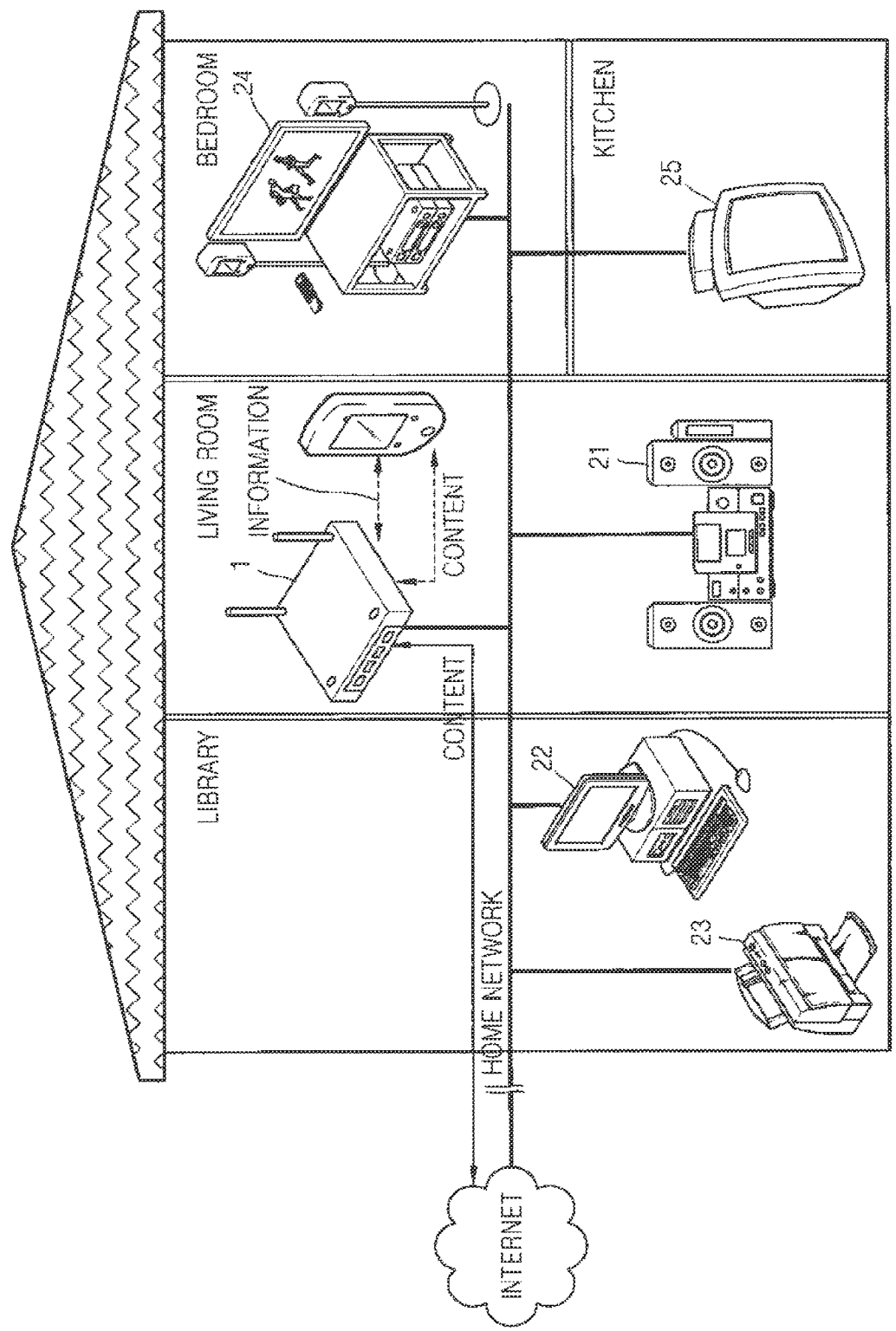
FIG. 11 is a diagram illustrating an application of a home system according to an exemplary embodiment of the present invention.

FIG. 11 is a diagram illustrating an application of a home system according to an exemplary embodiment of the present invention. In detail, FIG. 11 illustrates a case where a user uses Internet services via the wireless guest device 3. In an exemplary embodiment of the present invention, if the user simply brings the wireless guest device 3 near to or in contact with the AP 1, the wireless guest device 3 obtains Internet service content, e.g. a web document, etc., from Internet Service Provider (ISP) in the Internet and performs browsing of the Internet service content.

Figure 12:
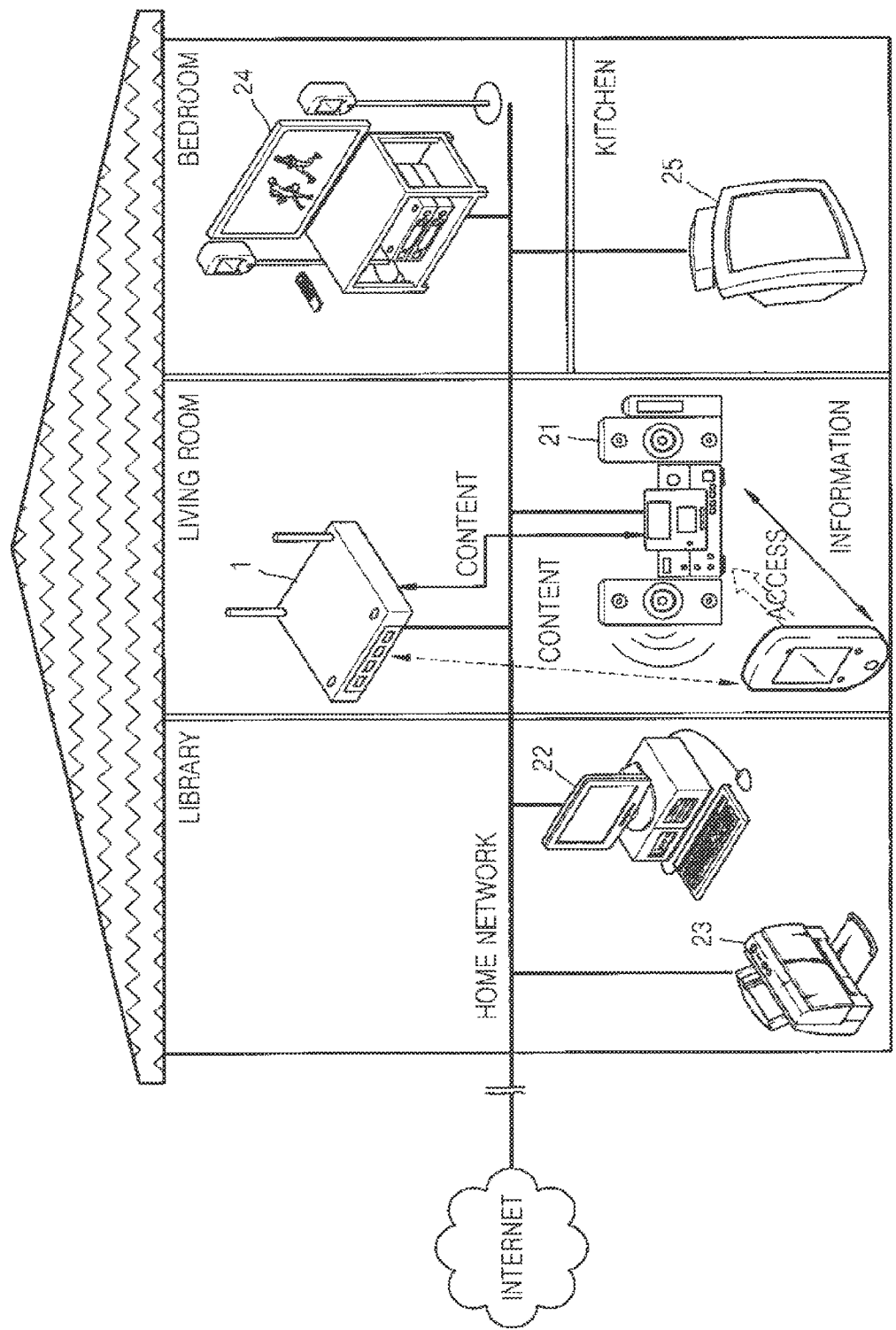
FIG. 12 is a diagram illustrating an application of a home system according to another exemplary embodiment of the present invention.

FIG. 12 is a diagram illustrating an application of a home system according to another exemplary embodiment of the present invention. In detail, FIG. 12 illustrates a case where a user continuously reproduces audio content, which is being reproduced by an audio system 21, on a wireless guest device 3 in order to continue using of the audio content even outside of the user's home. In an exemplary embodiment of the present invention, if the user merely brings the wireless guest device 3 near to or in contact with the audio system 21 that is reproducing the audio content, the wireless guest device 3 can obtain and reproduce the audio content from the audio system 21.

Figure 13:
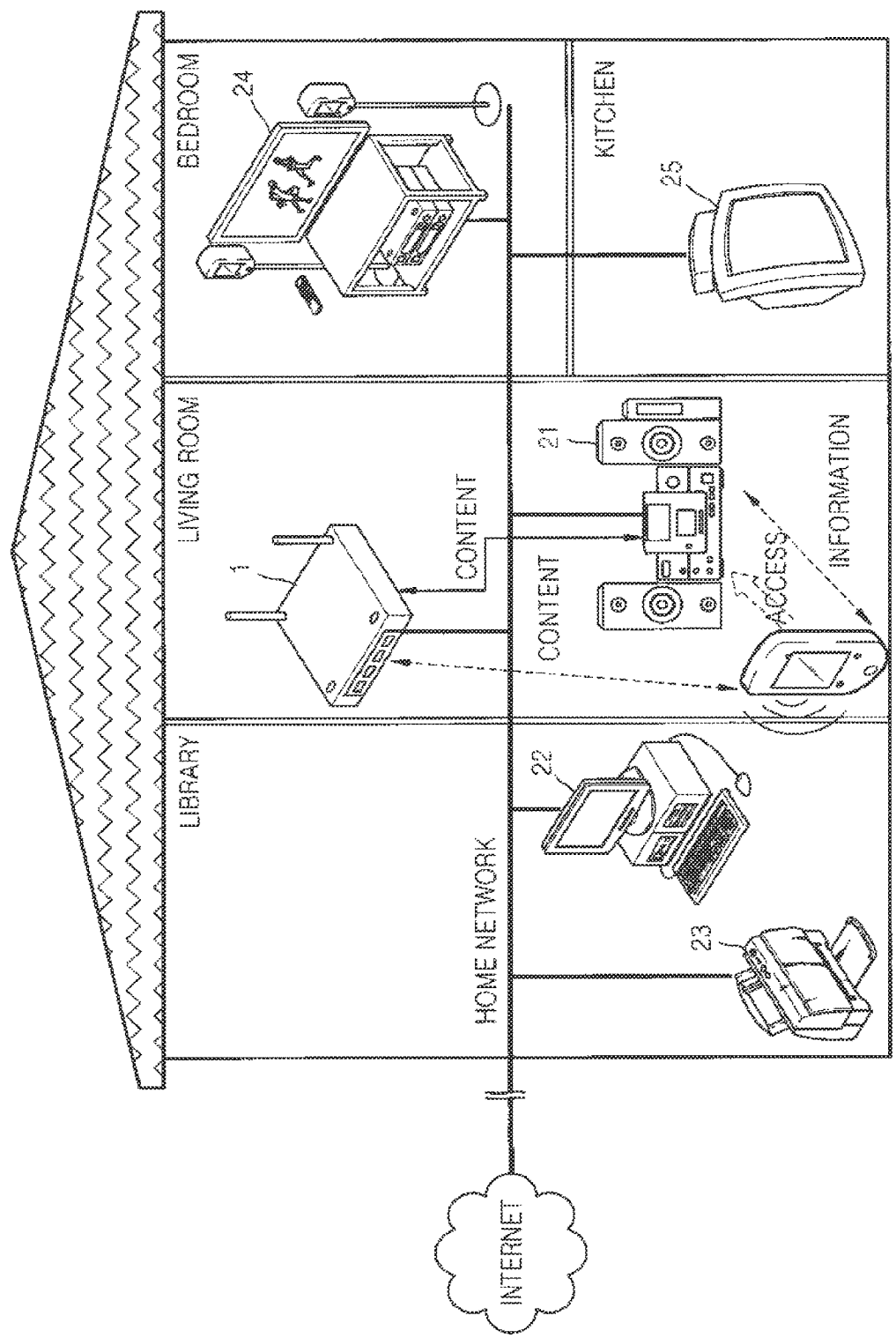
FIG. 13 is a diagram illustrating an application of a home system according to another exemplary embodiment of the present invention.

FIG. 13 is a diagram illustrating an application of a home system according to another exemplary embodiment of the present invention. In detail, FIG. 13 illustrates a case where a user continuously reproduces audio content, which is being reproduced by a wireless guest device 3, on an audio system 21. This provides a high-quality reproduction. In an exemplary embodiment of the present invention, if the user merely brings the wireless guest device 3, which is reproducing the audio content, near to or in contact with the audio system 21, the audio system 21 can obtain and reproduce the audio content from the wireless guest device 3.

Figure 14:
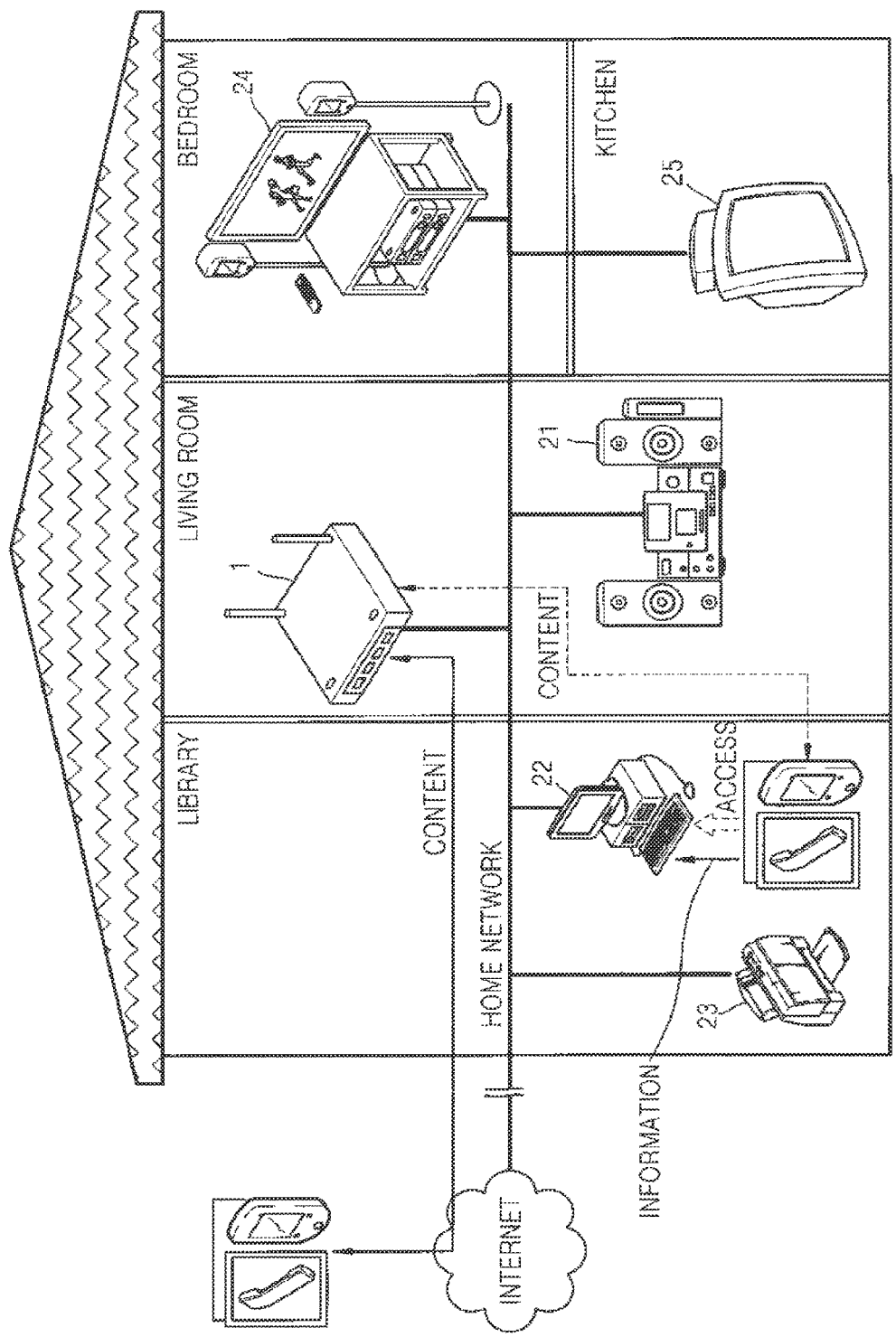
FIG. 14 is a diagram illustrating an application of a home system according to another exemplary embodiment of the present invention.

FIG. 14 is a diagram illustrating an application of a home system according to another exemplary embodiment of the present invention. In detail, FIG. 14 illustrates a case where a user uses a Voice over IP (VoIP) based Internet calling service via a wireless guest device 3. In an exemplary embodiment of the present invention, if the user searches a personal computer (PC) 22 for a telephone number and brings the wireless guest device 3 near to or in contact with the PC 22, the wireless guest device 3 can either obtain and reproduce voice content from another wireless device on the Internet, or provide voice content to another wireless device on the Internet. Accordingly, it is possible to eliminate the trouble caused when the user inputs the telephone number by himself/herself.

The above exemplary embodiments of the present invention can be embodied as a computer program to be executed in a general digital computer via a computer readable medium. The data structures used in the above exemplary embodiments may be recorded in a computer readable medium by using various devices.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

According to the exemplary embodiments of the present invention, if a user merely brings a wireless guest device near to or in contact with an AP or a wired home device, the wireless guest device can automatically not only set an optimum security environment for a wireless network, but the user can also set an application that the user desires. That is, through only a common sense intuitional user interaction, i.e., bringing the wireless guest device near to or in contact with another device, it is possible to allow the wired guest device to automatically set an optimum security environment for the wireless network and to use an Internet service, a VoIP service, etc. via an AP. Further, it is possible to allow the wireless guest device to continuously reproduce content that is being reproduced by an audio system, a television (TV), or the like.

Also, according to the exemplary embodiments of the present invention, a seed key is stored in an AP or a smart card in a wired home device, not in a wireless guest device, and a temporary key generated in the smart card is provided to the wireless guest device. Therefore, a user does not need to set wireless network security information, such as an encryption key, with respect to the wireless guest device. In particular, the temporary key is generated only through one-to-one proximity communication between the wireless guest device and the AP or between the wireless guest device and a wired home device, and is revoked when a session between the wireless guest device and AP or between the wireless guest device and the wired home device ends. Therefore, the temporary key cannot be disclosed to a wireless guest device that is not authorized by the user, and the user does not need to update the wireless network security information by revoking an encryption key in the wireless device, for example.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A printer apparatus, comprising:
  a first interface configured to:
    transmit, in response to detecting a presence of a mobile device, access information comprising identification information or Media Access Control (MAC) address to the mobile device via a first communication channel which is a short distance wireless communication channel, and
    transmit application information for executing an application to the mobile device via the first communication channel, the application to be executed at the mobile device;
  a second interface configured to:
    establish a second communication channel with the mobile device based on the access information,
    receive control information from the mobile device via the second communication channel, the control information being generated at the mobile device, and
    receive content to be printed from the mobile device via the second communication channel; and
  a controller configured to control to print the content based on the control information,
  wherein the first communication channel and the second communication channel correspond to two different communication standards, and
  wherein the application information comprises a Uniform Resource Locator (URL).

2. The printer apparatus of claim 1, wherein the printer apparatus processes a printing operation based on the control information.

3. The printer apparatus of claim 1, wherein the first communication channel is established by one of Infrared in Data Association (IrDA), Near Field Communication (NFC), Bluetooth, Smart Card and Radio Frequency Identification (RFID), and
  wherein the second communication channel is used in a wireless LAN network which is compatible with IEEE 802.11 standard.

4. The printer apparatus of claim 1, wherein the first communication channel supports unidirectional communication.

5. The printer apparatus of claim 1, wherein the identification information comprises Service Set Identity (SSID).

6. The printer apparatus of claim 1, wherein the second communication channel is established automatically based on the access information provided via the first communication channel.

7. The printer apparatus of claim 1, wherein the mobile device is a guest wireless device that is not pre-registered with a network corresponding to the second communication channel,
  wherein the first communication channel is established by one of Infrared in Data Association (IrDA), Near Field Communication (NFC), Bluetooth, Smart Card and Radio Frequency Identification (RFID), and
  wherein the second communication channel is established automatically based on the access information provided via the first communication channel.

8. A method of printing content by a printer apparatus, the method comprising:
provliding access information comprising identification information or Media Access Control (MAC) address via a first communication channel which is a short distance wireless communication channel, in response to detecting a presence of a mobile device;
transmitting application information for executing an application to the mobile device via the first communication channel, the application to be executed at the mobile device;
establishing a second communication channel with the mobile device based on the access information;
receiving control information from the mobile device via the second communication channel, the control information being generated at the mobile device;
receiving content to be printed from the mobile device via the second communication channel; and
printing the content based on the control information,
wherein the first communication channel and the second communication channel correspond to two different communication standards, and
wherein the application information comprises a Uniform Resource Locator (URL).

9. The method of claim 8, wherein the printer apparatus processes printing operation based on the control information,
wherein the first communication channel is established by one of Infrared in Data Association (IrDA), Near Field Communication (NFC), Bluetooth, Smart Card and Radio Frequency Identification (RFID), and
wherein the second communication channel is used in a wireless LAN network which is compatible with IEEE 802.11 standard.

10. A mobile device, comprising:
a controller configured to:
execute an application using application information for executing the application, and
generate control information based on execution of the application; a first interface configured to:
obtain access information comprising identification information or Media Access Control (MAC) address from a printer apparatus via a first communication channel which is a short distance wireless communication channel, when the mobile device detect the printer apparatus, and
receive the application information from the printer apparatus via the first communication channel; and
a second interface configured to:
establish a second communication channel with the printer apparatus based on the access information,
transmit the control information to the printer apparatus via the second communication channel, and
transmit content to be printed to the printer apparatus via the second communication channel,
wherein a communication standard of the first communication channel is different from a communication standard of the second communication channel, and
wherein the application information comprises a Uniform Resource Locator (URL).

11. The mobile device of claim 10, wherein the identification information comprises Service Set Identity (SSID).

12. The mobile device of claim 10, wherein the first communication channel is established by one of Infrared in Data Association (IrDA), Near Field Communication (NFC), Bluetooth, Smart Card and Radio Frequency Identification (RFID), and
wherein the second communication channel is established automatically based on the access information provided via the first communication channel.

13. A method performed by a mobile device, the method comprising:
executing an application using application information;
generating control information based on execution of the application;
obtaining access information comprising identification information or Media Access Control (MAC) address from a printer apparatus via a first communication channel which is a short distance wireless communication channel, when the mobile device detect the printer apparatus;
receiving the application information for executing the application from the printer apparatus via the first communication channel;
establishing a second communication channel with the printer apparatus based on the access information;
transmitting the control information to the printer apparatus via the second communication channel; and
transmitting, to the printer apparatus, content to be printed via the second communication channel,
wherein a communication standard of the first communication channel is different from a communication standard of the second communication channel, and
wherein the application information comprises a Uniform Resource Locator (URL).

* * * * *